(12) United States Patent
Shikama

(10) Patent No.: US 6,577,455 B2
(45) Date of Patent: Jun. 10, 2003

(54) WIDE ANGLE PROJECTION LENS AND PROJECTION DISPLAY DEVICE

(75) Inventor: Shinsuke Shikama, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 98 days.

(21) Appl. No.: 09/933,896

(22) Filed: Aug. 22, 2001

(65) Prior Publication Data

US 2002/0154418 A1 Oct. 24, 2002

(30) Foreign Application Priority Data

Feb. 14, 2001 (JP) ........................................ 2001-036778

(51) Int. Cl.[7] .................... G02B 13/04; G02B 13/22; G02B 3/00
(52) U.S. Cl. .................. 359/753; 359/663; 359/651
(58) Field of Search ................................ 359/649, 651, 359/663, 753

(56) References Cited

U.S. PATENT DOCUMENTS

| 5,218,480 A | 6/1993 | Moskovich | 359/753 |
| 5,442,484 A | 8/1995 | Shikawa | 359/651 |
| 5,625,495 A | 4/1997 | Moskovich | 359/663 |
| 5,973,848 A | 10/1999 | Taguchi et al. | 359/651 |
| 2002/0154418 A1 * | 10/2002 | Shikama | 359/754 |

FOREIGN PATENT DOCUMENTS

JP    2000275729    10/2000

* cited by examiner

Primary Examiner—Georgia Epps
Assistant Examiner—David N. Spector
(74) Attorney, Agent, or Firm—Birch, Stewart, Kolasch, & Birch, LLP.

(57) ABSTRACT

A wide angle projection lens consists of a Gnp lens group having positive refractive power and a Gf lens group having positive refractive power in the order from a large conjugate side toward a small conjugate side, and further the Gnp lens group consists of a Gn lens group having negative refractive power and a Gp lens group having positive refractive power in the order from the large conjugate side toward the small conjugate side, while satisfying $-1.8 < fn/f < -1.1$, $3.2 < fp/f < 5.5$, $1.2 < Dnp/f < 2.4$ and $2.8 < ff/fnp < 4.4$, where f: focal length of the whole lens system, fn: focal length of the Gn lens group, fp: focal length of the Gp lens group, Dnp: air spacing between the Gn lens group and the Gp lens group, fnp: focal length of the Gnp lens group and ff: focal length of the Gf lens group. With this constitution provided are a projection lens capable of wide angle projection which can be applied to a projector of off-axis projection system and a projection display device mounted with the projection lens.

19 Claims, 17 Drawing Sheets

LATERAL ABERRATION

ON AXIS

MAXIMUM IMAGE HEIGHT 11.7 mm

LATERAL ABERRATION

ON AXIS

MAXIMUM IMAGE HEIGHT 11.7 mm

LATERAL ABERRATION

ON AXIS

MAXIMUM IMAGE HEIGHT 11.7 mm

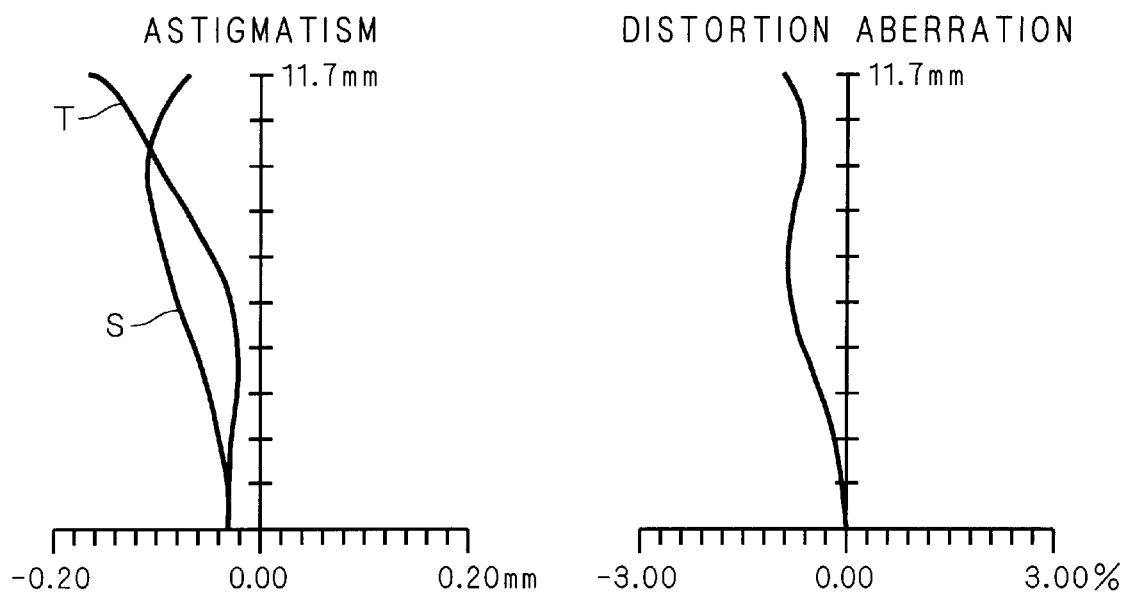
F I G . 10

LATERAL ABERRATION

ON AXIS

MAXIMUM IMAGE HEIGHT 11.7 mm

LATERAL ABERRATION

ON AXIS

MAXIMUM IMAGE HEIGHT 11.7 mm

LATERAL ABERRATION

ON AXIS

MAXIMUM IMAGE HEIGHT 11.7 mm on-axis PROJECTION (4:3)

off-axis PROJECTION (4:3)

on-axis PROJECTION (16:9)

off-axis PROJECTION (16:9)

WIDE ANGLE PROJECTION LENS AND PROJECTION DISPLAY DEVICE

BACKGROUND OF THE INVENTION

1. Field of the Invention

The present invention relates to a constitution of a wide angle projection lens having a large image circle, which is mounted in a projection display device using a light valve, and a projection display device mounted with this wide angle projection lens.

2. Description of the Background Art

FIG. 17 is an illustration showing an eccentric projection optical system in a projection display device using a background-art reflection light valve. This figure shows an illumination luminous flux 91 illuminating a reflection light valve 6, a reflection luminous flux 92 reflected by the reflection light valve 6 and entering a projection lens 8 and an optical axis 93 of the projection lens 8.

The illumination light 91 is irradiated diagonally with respect to the reflection light valve 6, and the luminous flux 92 reflected by the reflection light valve 6, being two-dimensionally modulated in a surface of the reflection light valve 6, is enlargedly projected on a not-shown screen by the projection lens 8.

A display area of the reflection light valve 6 is perpendicular to the optical axis 93 of the projection lens 8 and disposed eccentrically with its center point displaced downward with respect to the lens optical axis 93. This is intended to avoid physical interference between an illumination optical system generating the illumination light 91 and the projection lens 8, prevent generation of eclipse of the illumination luminous flux or projection luminous flux and obtain a uniform projection image.

In order to dispose the reflection light valve 6 eccentrically with respect to the projection lens 8, as discussed above, it is necessary to enlarge the specifications on the image circle of the projection lens 8 (an area where the aberration of the projection lens 8 is well corrected). This situation will be discussed, referring to FIGS. 18A, 18B, 19A and 19B.

FIGS. 18A and 18B show image circles IMC of the projection lens 8 projecting the light valve 6 with aspect ratio of 4:3. Specifically, FIG. 18A shows a case where the center point of the light valve 6 coincides with the center point of the image circle IMC (on-axis projection) and FIG. 18B shows a case where the center point of the upper long side of the light valve 6 coincides with the center point of the image circle IMC (off-axis projection). It can be seen from these figures that the diameter of the image circle in the on-axis projection is 5 while that of the image circle in the off-axis projection is 7.2, being larger by 44%.

FIGS. 19A and 19B show image circles IMC of the projection lens 8 projecting the light valve 6 with aspect ratio of 16:9. Specifically, FIG. 19A shows a case where the center point of the light valve 6 coincides with the center point of the image circle IMC (on-axis projection) and FIG. 19B shows a case where the center point of the upper long side of the light valve 6 coincides with the center point of the image circle IMC (off-axis projection). It can be seen from these figures that the diameter of the image circle in the on-axis projection is 18.36 while that of the image circle in the off-axis projection is 24.08, being larger by about 31%.

Further, it is understood from the above examples that the diameter of the image circle becomes larger when the degree of eccentricity of the light valve 6 is larger.

Since the off-axis projection system has a simple constitution and a projection light corresponding to the center point of the screen can go out, being tilted upwards with respect to the optical axis 93 of the projection lens, there is a case where the off-axis projection system is adopted in a small-size front projection type projector. In this system, the image circle of the projection lens 8 becomes larger than the diagonal size of the light valve 6. This makes it difficult to realize both reduction in focal length required for size-reduction of a body incorporating the whole optical system and excellent imaging, especially in a case of applying the off-axis projection system to a rear projection type projector.

As a background-art example of projection lens for DMD (Digital Micromirror Device) projection, for instance, one disclosed in Japanese Patent Application Laid Open Gazette No. 2000-275729 is well known. This background-art example proposes a constitution of a projection lens with half angle of projection view ω=27.3 degrees at F/3 with respect to the tilt angle of ±10 degrees of micromirrors constituting the DMD. This also discloses a lens constitution intended for reduction in interference between the illumination luminous flux and the projection luminous flux by disposing the stop of the whole lens system on the DMD side. Since an element having micromirrors with the tilt angle of ±12 degrees is being developed through the research and development of DMD, however, the specification of about F/2.4 is required for a projection lens in order to achieve a high-intensity projector while ensuring sufficient projection luminous flux. Further, the half angle of projection view of 27.3 degrees in the above example, which makes the projection distance with respect to a predetermined screen size too large in a rear projection type projector, has a problem in being used for a small-size rear projection type projector. It is desirable to ensure a half angle of view of 40 degrees or more for a projection lens.

Items of basic specification required for a projection lens of off-axis projection system used in a rear projection type display device are as follows.

(1) Wide angle of view: a projection lens with short focal length is needed in order to mount an optical system in a small-size body with the projection distance shortened. As discussed above, it is desirable that the half angle of view ω of lens>40 degrees at F/2.4.

(2) Small diameter of a lens on the incident side: it is desired that the diameter of a projection lens on the incident side of the luminous flux (light valve side) should be as small as possible in order to avoid luminous flux eclipse caused by interference between the illumination optical system and the projection optical system.

(3) Long back focal length: combined with the requirement (2), it is required that the back focal length on the light valve side should be set longer in order to avoid luminous flux eclipse caused by the interference between the illumination optical system and the projection optical system.

(4) Large image circle: required is a lens system with aberration well corrected in a large image circle in order to be used for the off-axis projection.

In the rear projection type display device required is a projection lens further having the following fundamental properties besides satisfying the above basic specifications relating to (1) wide angle of view, (2) small diameter of a lens on the incident side, (3) long back focal length and (4) large image circle.

(a) Low chromatic aberration: it is needed to control the chromatic difference of magnification, typically to about pixel-pitch level, or desirably to half the pixel-pitch level or lower in order to sufficiently reduce the difference in projection magnification among primary color pixels of a projection image, and it is further needed to control the longitudinal chromatic aberration to be smaller so that the focuses of primary colors may coincide with one another.

(b) Low distortion aberration: it is required that a projection lens should be designed to control the displacement of pixel off from an ideal point due to distortion aberration typically to about 1% or lower since distortions at peripheral portions in a screen are visible as a rectangular projection image is projected inside a frame of a projection screen in a rear projection type projector.

(c) High resolution: in order to enlargedly project an original image of a high-density and multipixel light valve element having million-level pixels which has been increasingly developed in recent years, a projection lens of high resolution corresponding to a fine pixel structure of the light valve is required, and further in order to ensure high resolution of the projection lens, it is needed to sufficiently correct on-axis aberrations and off-axis aberrations other than the above-discussed chromatic aberration and distortion aberration.

SUMMARY OF THE INVENTION

The present invention is directed to a wide angle projection lens. According to a first aspect of the present invention, the wide angle projection lens comprises a Gnp lens group having positive refractive power and a Gf lens group having positive refractive power in the order from a large conjugate side toward a small conjugate side, the Gnp lens group comprises a Gn lens group having negative refractive power and a Gp lens group having positive refractive power in the order from a large conjugate side toward a small conjugate side, and the wide angle projection lens satisfies relations of the following expressions (1), (2), (3) and (4).

$$-1.8 < fn/f < -1.1 \quad (1)$$

$$3.2 < fp/f < 5.5 \quad (2)$$

$$1.2 < Dnp/f < 2.4 \quad (3)$$

$$2.8 < ff/fnp < 4.4 \quad (4)$$

where f: focal length of the whole lens system fn: focal length of the Gn lens group fp: focal length of the Gp lens group Dnp: air spacing between the Gn lens group and the Gp lens group fnp: focal length of the Gnp lens group ff: focal length of the Gf lens group.

According to a second aspect of the present invention, the wide angle projection lens of the first aspect satisfies a relation of the following expression (5).

$$3.0 < BFLnp/fnp < 4.5 \quad (5)$$

where fnp: focal length of the Gnp lens group

BFLnp: back focal length of the Gnp lens group.

According to a third aspect of the present invention, the wide angle projection lens of the first aspect satisfies a relation of the following expression (6).

$$|EXPnp|/fnp < 2.0 \quad (6)$$

where fnp: focal length of the Gnp lens group

|EXPnp|: absolute value of pupil distance on the small conjugate side of the Gnp lens group viewed from the last surface on the small conjugate side.

According to a fourth aspect of the present invention, the wide angle projection lens of the first aspect satisfies a relation of the following expression (7).

$$0.6 < Dpf/ff < 1.2 \quad (7)$$

where ff: focal length of the Gf lens group

Dpf: air spacing between the Gp lens group and the Gf lens group.

According to a fifth aspect of the present invention, the wide angle projection lens of the first aspect satisfies a relation of the following expression (8).

$$0.75 < (Dpf - EXPnp)/ff < 1.5 \quad (8)$$

where ff: focal length of the Gf lens group

Dpf: air spacing between the Gp lens group and the Gf lens group

EXPnp: pupil distance on the small conjugate side of the Gnp lens group viewed from the last surface on the small conjugate side.

According to a sixth aspect of the present invention, in the wide angle projection lens of the first aspect, the Gn lens group comprises a Gn1 lens group having negative refractive power and a Gn2 lens group having negative refractive power in the order from the large conjugate side toward the small conjugate side, and the Gp lens group comprises a Gp1 lens group having positive refractive power and a Gp2 lens group having positive refractive power in the order from the large conjugate side toward the small conjugate side.

According to a seventh aspect of the present invention, in the wide angle projection lens of the sixth aspect, the Gn1 lens group comprises a first lens which is a meniscus lens with a convex surface on the large conjugate side, having negative refractive power; a second lens which is a meniscus lens with a convex surface on the large conjugate side, having negative refractive power; a third lens which is a biconvex lens having positive refractive power; a fourth lens which is a meniscus lens with a convex surface on the large conjugate side, having negative refractive power; and a fifth lens which is a biconcave lens having negative refractive power in the order from the large conjugate side toward the small conjugate side, the Gn2 lens group comprises a sixth lens which is a biconvex lens having positive refractive power; and a seventh lens with a concave surface on the small conjugate side, having negative refractive power in the order from the large conjugate side toward the small conjugate side, and the Gp1 lens group comprises an eighth lens with a convex surface on the large conjugate side, having positive refractive power; a ninth lens which is a meniscus lens with a convex surface on the small conjugate side, having positive refractive power; a tenth lens which is a biconcave lens having negative refractive power; and an eleventh lens which is a biconvex lens having positive refractive power and connected to the tenth lens.

According to an eighth aspect of the present invention, in the wide angle projection lens of the sixth aspect, the Gp2 lens group includes at least one aspheric surface.

According to a ninth aspect of the present invention, in the wide angle projection lens of the sixth aspect, the Gp2 lens group includes stop means.

According to a tenth aspect of the present invention, in the wide angle projection lens of the first aspect, the Gf lens group is made of a plano-convex lens with a convex surface on the large conjugate side.

According to an eleventh aspect of the present invention, in the wide angle projection lens of the first aspect, the Gf lens group includes an aspheric surface.

According to a twelfth aspect of the present invention, the wide angle projection lens of the seventh aspect satisfies relations of the following expressions (9), (10), (11), (12), (13) and (14).

$$v1<41 \tag{9}$$

$$v3<31 \tag{10}$$

$$v5<32 \tag{11}$$

$$n1>1.54 \tag{12}$$

$$n3>1.65 \tag{13}$$

$$n5>1.65 \tag{14}$$

where $v1$: Abbe number in d line of vitreous material making up the first lens $v3$: Abbe number in d line of vitreous material making up the second lens $v5$: Abbe number in d line of vitreous material making up the third lens $n1$: refractive index in d line of vitreous material making up the first lens $n3$: refractive index in d line of vitreous material making up the second lens $n5$: refractive index in d line of vitreous material making up the third lens.

According to a thirteenth aspect of the present invention, the wide angle projection lens of the seventh aspect satisfies relations of the following expressions (15), (16), (17), (18), (19) and (20).

$$v15<35 \tag{15}$$

$$v19<33 \tag{16}$$

$$v20>50 \tag{17}$$

$$n15>1.60 \tag{18}$$

$$n19>1.65 \tag{19}$$

$$n20<1.70 \tag{20}$$

where $v15$: Abbe number in d line of vitreous material making up the eighth lens $v19$: Abbe number in d line of vitreous material making up the tenth lens $v20$: Abbe number in d line of vitreous material making up the eleventh lens $n15$: refractive index in d line of vitreous material making up the eighth lens $n19$: refractive index in d line of vitreous material making up the tenth lens $n20$: refractive index in d line of vitreous material making up the eleventh lens.

The present invention is also directed to a projection display device. According to a fourteenth aspect of the present invention, the projection display device comprises: a light source; a reflection light valve having an image display surface; illumination optical means leading an outgoing luminous flux from the light source to the reflection light valve; and the wide angle projection lens as defined in any one of the first to thirteenth aspects, enlargedly projecting a modulated luminous flux which is two-dimensionally modulated through reflection by the reflection light valve.

According to a fifteenth aspect of the present invention, in the projection display device of the fourteenth aspect, a lens closest to the reflection light valve among optical elements constituting the illumination optical means is a plano-convex lens, the plano-convex lens is disposed proximately to the image display surface of the reflection light valve, with its plane surface facing the same, and the plano-convex lens is also used as a Gf lens group closest to a small conjugate side among groups of lenses constituting the wide angle projection lens.

According to a sixteenth aspect of the present invention, in the projection display device of the fourteenth aspect, the intersection of the image display surface of the reflection light valve and an optical axis of the wide angle projection lens does not coincide with a center point of the image display surface.

According to a seventeenth aspect of the present invention, in the projection display device of the fifteenth aspect, the optical axis of the wide angle projection lens is parallel to a normal of the image display surface of the reflection light valve and an optical axis of lenses other than the plano-convex lens in the illumination optical means is tilted with respect to the normal of the image display surface of the reflection light valve.

According to an eighteenth aspect of the present invention, in the projection display device of the fourteenth aspect, the reflection light valve is a liquid crystal light valve.

According to a nineteenth aspect of the present invention, in the projection display device of the fourteenth aspect, the reflection light valve is made of a mirror array including a plurality of tiltable unit mirrors.

<Functions>

The wide angle projection lens of these aspects of the present invention performs the following functions.

In the wide angle projection lens of the first aspect of the present invention, it is possible to achieve an image circle large enough for the off-axis projection system, ensure such a large air spacing as to avoid interference between the illumination optical system and the projection optical system and a small lens diameter of an incident part of the front group in the wide angle projection lens system and realize excellent optical properties such as low chromatic aberration, low distortion aberration and high resolution in spite of wide angle of view and short focal length.

Further, the conditional expressions (1) to (3) are intended to correct the aberration properties of the whole system well while ensuring a long back focal length in the Gnp lens group which is the front group of the projection lens system.

The conditional expression (1) defines the ratio of the focal length of the Gn lens group having negative refractive power among the Gnp lens group to the whole lens system. Over the upper limit of the conditional expression (1), though the retrofocus property of the Gnp lens group is enhanced and it is therefore advantageous to keep a long back focal length of the Gnp lens group, high-order off-axis aberrations such as astigmatism and coma aberration by the Gn lens group occur too greatly and therefore it becomes more difficult to realize excellent imaging properties. Below the lower limit of the conditional expression (1), it becomes more difficult to ensure a long back focal length of the Gnp lens group. Since it is necessary to ensure an unnecessary large space between the Gn lens group and the Gp lens group in order to ensure the long back focal length of the Gnp lens group, unpreferably, the total length of the whole lens system increases and accordingly the outer diameter of the Gn1 lens group which is the front group of the Gn lens group becomes larger.

The conditional expression (2) defines the ratio of the focal length of the Gp lens group having positive refractive power among the Gnp lens group to the whole lens system. Over the upper limit of the conditional expression (2), though it is advantageous to keep a long back focal length of the Gnp lens group, the focal length of the whole lens system becomes long and it becomes more difficult to ensure an necessary angle of view. Further, in order to satisfy the necessary angle of view, the negative power of the Gn lens group becomes great and it is therefore becomes more difficult to correct the off-axis aberration. Below the lower limit of the conditional expression (2), it becomes more difficult to ensure a long back focal length of the Gnp lens group.

The conditional expression (3) defines the ratio of the air spacing between the Gn lens group and the Gp lens group to the focal length of the whole lens system. Over the upper limit of the conditional expression (3), though it is advantageous to ensure a long back focal length of the Gnp lens group, the diameter of lens in the Gn lens group becomes large and the total length of the whole lens system becomes unnecessarily long. Below the lower limit of the conditional expression (3), it becomes more difficult to ensure a long back focal length of the Gnp lens group. Further, in order to satisfy the necessary angle of view, the negative power of the Gn lens group becomes great and it is therefore becomes more difficult to correct the off-axis aberration.

The conditional expression (4) defines the ratio of the focal lengths between the Gf lens group and the Gnp lens group. Over the upper limit of the conditional expression (4), though the air spacing between the Gnp lens group and the Gf lens group becomes large, the total length of the whole lens system becomes unnecessarily long and the diameter of lens on the incident side (light valve side) among the Gnp lens group becomes large when the necessary F number is ensured. Further, there arises necessity of ensuring an unnecessarily long back focal length of the Gnp lens group and it is therefore becomes more difficult to correct the off-axis aberration. Below the lower limit of the conditional expression (4), the air spacing between the Gnp lens group and the Gf lens group becomes small and an interference is thereby caused between the illumination optical system and the projection optical system, to raises a problem in ensuring the uniformity in luminance distribution of the projection image.

The wide angle projection lens of the second aspect of the present invention can ensure an appropriate back focal length of the Gnp lens group and realize excellent imaging properties. The conditional expression (5) defines the ratio of the back focal length and the focal length of the Gnp lens group. Over the upper limit of the conditional expression (5), though a long back focal length can be ensured and it is therefore advantageous to avoid the interference between the illumination optical system and the projection optical system, there arises necessity of ensuring an unnecessarily long back focal length of the Gnp lens group and therefore correction of the off-axis aberration especially becomes more difficult, to cause deterioration in resolution of lens system.

Below the lower limit of the conditional expression (5), the back focal length of the Gnp lens group becomes short and the interference between the illumination optical system and the projection optical system raises a problem in ensuring the uniformity in luminance distribution of the projection image.

The wide angle projection lens of the third aspect of the present invention can reduce the diameter of the lens on the light valve side (the small conjugate side of the whole lens system) among the Gnp lens group and avoid the interference between the illumination optical system and the projection optical system. The conditional expression (6) defines the ratio between the absolute value of the pupil distance on the small conjugate side viewed from the last surface of the small conjugate side and the focal length of the Gnp lens group. Over the upper limit of the conditional expression (6), the pupil distance is too far from the last surface of the Gnp lens group and the diameter of lens on the light valve side becomes large and an interference is thereby caused between the illumination optical system and the projection optical system, to raise a problem such as deterioration of uniformity in luminance distribution of the projection image.

The wide angle projection lens of the fourth aspect of the present invention can ensure an appropriate air spacing between the Gp lens group and the Gf lens group, avoid the interference between the illumination optical system and the projection optical system and realize excellent imaging properties. The conditional expression (7) defines the ratio between the air spacing between the Gp lens group and the Gf lens group and the focal length of the Gf lens group. Over the upper limit of the conditional expression (7), though a large air spacing can be ensured and it is therefore advantageous to avoid the interference between the illumination optical system and the projection optical system, there arises necessity of ensuring an unnecessarily long back focal length of the Gnp lens group and therefore correction of the off-axis aberration especially becomes more difficult, to cause deterioration in resolution of the lens system. Below the lower limit of the conditional expression (7), the air spacing becomes too small and an interference is thereby caused between the illumination optical system and the projection optical system, to raise a problem such as deterioration of uniformity in luminance distribution of the projection image.

The wide angle projection lens of the fifth aspect of the present invention can ensure an appropriate distance from the Gf lens group to the pupil on the small conjugate side of the Gnp lens group, avoid the interference between the illumination optical system and the projection optical system, realize excellent imaging properties and couple the reflection light from the light valve onto the projection lens system with high efficiency. The conditional expression (8) defines the ratio between the distance from the Gf lens group and the pupil on the small conjugate side of the Gnp lens group and the focal length of the Gf lens group. Over the upper limit of the conditional expression (8), the reflection light from the light valve is condensed at a point closer to the light valve off from the pupil on the small conjugate side of the Gnp lens group and the efficiency in imaging of the reflection light onto the Gnp lens group is thereby lowered and the uniformity in luminance distribution of the projection image in the off-axis projection system is deteriorated. Below the lower limit of the conditional expression (8), the reflection light from the light valve is condensed at a point closer to the screen off from the pupil on the small conjugate side of the Gnp lens group and the efficiency in imaging of the reflection light onto the Gnp lens group is thereby lowered and the uniformity in luminance distribution of the projection image in the off-axis projection system is deteriorated. Further, since the air spacing between the Gf lens group and the Gnp lens group becomes small, an interference is thereby caused between the illumination optical system and the projection optical system, to deteriorate the uniformity in luminance distribution of the projection image.

In the wide angle projection lens of the sixth aspect of the present invention, since the Gn lens group comprises two groups of lenses, i.e., the Gn1 lens group and the Gn2 lens group and the Gp lens group comprises two groups of lenses, i.e., the Gp1 lens group and the Gp2 lens group, the constitution of the Gnp lens group having a long back focal length is made clearer and it is possible to easily provide a lens system to realize the basic specifications relating to (1) wide angle of view, (2) small diameter of a lens on the incident side, (3) long back focal length and (4) large image circle and the basic properties of (a) low chromatic aberration, (b) low distortion aberration and (c) high resolution, attaining the objects of the present invention.

In the wide angle projection lens of the seventh aspect of the present invention, the shape and the sign of refractive power (positive or negative) of the single lenses constituting the Gn1 lens group, the Gn2 lens group or the Gp1 lens group are made clear. As a result, it is possible to provide a specific constitution of a wide angle projection lens which has an image circle large enough for the off-axis projection system, ensures such a large air spacing as to avoid the interference between the illumination optical system and the projection optical system and has excellent optical properties such as low chromatic aberration, low distortion aberration and high resolution in spite of wide angle of view and short focal length.

In the wide angle projection lens of the eighth aspect of the present invention, since the Gp2 lens group includes an aspheric surface, especially high-order spherical aberration can be corrected strongly, to realize excellent imaging properties.

In the wide angle projection lens of the ninth aspect of the present invention, since the Gp2 lens group includes the stop means, it is possible to reduce the diameter of the lens on the small conjugate side among the Gnp lens group, prevent the interference between the illumination optical system and the projection optical system and improve the uniformity in luminance distribution of the projection image in the projection display device of off-axis projection system.

In the wide angle projection lens of the tenth aspect of the present invention, since the Gf lens group is a plano-convex lens and disposed with its plane surface facing the light valve side, it is possible to couple the reflection luminous flux from the light valve onto the Gnp lens group with high efficiency. Further, by facing the plane surface of the plano-convex lens toward the light valve, it becomes easier to set the relative positions of the Gf lens group and the light valve.

In the wide angle projection lens of the eleventh aspect of the present invention, since the Gf lens group includes an aspheric surface, high-order off-axis aberrations such as distortion aberration, coma aberration and astigmatism can be corrected strongly, to realize excellent imaging properties.

In the wide angle projection lens of the twelfth aspect of the present invention, by limiting the conditions of refractive index and Abbe number of the first to third lenses in the Gn1 lens group, an excellent correction of chromatic aberration is realized. The conditional expressions (9), (10) and (11) define the upper limits of Abbe number in the d lines of the respective vitreous materials making up the first lens, the second lens and the third lens. The conditional expression (12), (13) and (14) define the lower limits of refractive index in the d lines of the respective vitreous materials making up the first lens, the second lens and the third lens. Over the upper limits of the conditional expressions (9), (10) and (11), it becomes more difficult to correct the chromatic aberration of the whole lens system. Also below the lower limits of the conditional expressions (12), (13) and (14), it becomes more difficult to correct the chromatic aberration of the whole lens system.

In the wide angle projection lens of the thirteenth aspect of the present invention, by limiting the conditions of refractive index and Abbe number of the eighth, tenth and eleventh lenses in the Gp1 lens group, an excellent correction of chromatic aberration is realized. The conditional expressions (15) and (16) define the upper limits of Abbe number in the d lines of the respective vitreous materials making up the eighth lens and the tenth lens, and the conditional expression (17) defines the lower limit of Abbe number in the d line of the vitreous material making up the eleventh lens. The conditional expressions (18) and (19) define the lower limits of refractive index in the d lines of the respective vitreous materials making up the eighth lens and the tenth lens, and the conditional expression (20) defines the upper limit of refractive index in the d line of the vitreous material making up the eleventh lens. Over the upper limits of the conditional expressions (15), (16) and (20), it becomes more difficult to correct the chromatic aberration of the whole lens system. Also below the lower limits of the conditional expressions (17), (18) and (19), it becomes more difficult to correct the chromatic aberration of the whole lens system.

According to the fourteenth aspect of the present invention, it is possible to achieve a small-size, high-quality and low-cost projection display device mounted with the wide angle projection lens of any one of the first to thirteenth aspects.

According to the fifteenth aspect of the present invention, by disposing a plano-convex lens near the light valve, it is possible to achieve a projection display device capable of efficiently transmitting the luminous flux from the illumination optical system to the projection optical system. Further, by facing the plane surface of the plano-convex lens toward the light valve, it becomes easier to set the relative positions of the Gf lens group and the light valve.

According to the sixteenth aspect of the present invention, since a device of off-axis projection system in which the intersection between the image display surface and the optical axis of the projection lens is displaced from the center point of the image display surface is obtained, the interference between the illumination optical system and the projection optical system can be prevented by utilizing the property of large image circle of the wide angle projection lens as defined in any one of the first to thirteenth aspects.

In the projection display device of the seventeenth aspect of the present invention, by setting the normal of the image display surface of the light valve and the optical axis of the projection lens parallel to each other, the distortion of the projection image can be controlled within the limits of designed distortion aberration. Further, since the optical axis of lenses other than the plano-convex lens near the light valve among the illumination optical system is tilted with respect to the normal of the image display surface of the light valve, the interference between the illumination optical system and the projection optical system can be prevented.

According to the eighteenth aspect of the present invention, it is possible to achieve a small-size, high-quality and low-cost projection display device mounted with a liquid crystal light valve.

According to the nineteenth aspect of the present invention, it is possible to achieve a small-size, high-quality and low-cost projection display device mounted with a light valve having a movable micromirror array, such as DMD.

<Effects>

The wide angle projection lens of the first aspect of the present invention comprises the Gnp lens group having positive refractive power and the Gf lens group having positive refractive power in the order from the large conjugate side toward the small conjugate side and the Gnp lens group comprises the Gn lens group having negative refractive power and the Gp lens group having positive refractive power in the order from the large conjugate side toward the small conjugate side, and in this wide angle projection lens of the first aspect, the conditional expressions (1) to (3) define conditions for ensuring a long back focal length in the Gnp lens group which is the front group of the projection lens system while correcting the aberration properties of the whole system well and the conditional expression (4) defines the ratio of focal lengths between the Gf lens group and the Gnp lens group. As a result, a wide angle projection lens which has an image circle large enough for the off-axis projection system, ensures such a large air spacing as to avoid the interference between the illumination optical system and the projection optical system and a small diameter of lens in an incident part of the front group in the wide angle projection lens system and has excellent optical properties such as low chromatic aberration, low distortion aberration and high resolution in spite of wide angle of view and short focal length.

The wide angle projection lens of the second aspect of the present invention can ensure an appropriate back focal length of the Gnp lens group and realize excellent imaging properties of the whole lens system by defining the ratio of the back focal length and the focal length of the Gnp lens group by the conditional expression (5).

The wide angle projection lens of the third aspect of the present invention can reduce the diameter of the lens on the light valve side (the small conjugate side of the whole lens system) among the Gnp lens group and avoid the interference between the illumination optical system and the projection optical system by defining the ratio between the absolute value of the pupil distance on the small conjugate side of the Gnp lens group viewed from the last surface of the small conjugate side and the focal length of the Gnp lens group by the conditional expression (6). As a result, it becomes possible to enhance the uniformity in luminance distribution of a display image of the projection display device using the wide angle projection lens.

The wide angle projection lens of the fourth aspect of the present invention can ensure an appropriate air spacing between the Gp lens group and the Gf lens group, avoid the interference between the illumination optical system and the projection optical system to enhance the uniformity in luminance distribution of the projection image, and realize excellent imaging properties by defining the ratio between the air spacing between the Gp lens group and the Gf lens group and the focal length of the Gf lens group by the conditional expression (7).

The wide angle projection lens of the fifth aspect of the present invention can ensure an appropriate distance from the Gf lens group to the pupil of the Gnp lens group on the small conjugate side, avoid the interference between the illumination optical system and the projection optical system to enhance the uniformity in luminance distribution of the projection image, realize excellent imaging properties, and couple the reflection light from the light valve onto the projection lens system with high efficiency by defining the ratio between the distance from the Gf lens group and the pupil of the Gnp lens group on the small conjugate side and the focal length of the Gf lens group by the conditional expression (8).

In the wide angle projection lens of the sixth aspect of the present invention, since the Gn lens group which is a constituent of the Gnp lens group comprises two groups of lenses, i.e., the Gn1 lens group and the Gn2 lens group and the Gp lens group which is a constituent of the Gnp lens group comprises two groups of lenses, i.e., the Gp1 lens group and the Gp2 lens group, the constitution of the Gnp lens group having a large back focal length can be achieved and it is possible to achieve an image circle large enough for the off-axis projection system, ensure such a large air spacing as to avoid the interference between the illumination optical system and the projection optical system and a small diameter of lens in an incident part of the front group in the wide angle projection lens system and realize excellent optical properties such as low chromatic aberration, low distortion aberration and high resolution in spite of wide angle of view and short focal length.

In the wide angle projection lens of the seventh aspect of the present invention, a specific constitution of the single lenses constituting the Gn1 lens group, the Gn2 lens group or the Gp1 lens group on their shape and sign of refractive power (positive or negative) is made clear. As a result, it is possible to provide a wide angle projection lens which has an image circle large enough for the off-axis projection system, ensures such a large air spacing as to avoid the interference between the illumination optical system and the projection optical system and a small diameter of lens in an incident part of the front group in the wide angle projection lens system and has excellent optical properties such as low chromatic aberration, low distortion aberration and high resolution in spite of wide angle of view and short focal length.

In the wide angle projection lens of the eighth aspect of the present invention, since the Gp2 lens group includes an aspheric surface, especially high-order spherical aberration can be corrected strongly, to realize excellent imaging properties.

In the wide angle projection lens of the ninth aspect of the present invention, since the Gp2 lens group closest to the light valve side among the Gnp lens group includes the stop means, it is possible to reduce the diameter of the lens on the small conjugate side among the Gnp lens group, prevent the interference between the illumination optical system and the projection optical system and improve the uniformity in luminance distribution of the projection image in the projection display device of off-axis projection system.

In the wide angle projection lens of the tenth aspect of the present invention, since the Gf lens group is a plano-convex lens and disposed with its plane surface facing the light valve side, it is possible to couple the reflection luminous flux from the light valve onto the Gnp lens group with high efficiency. Further, by facing the plane surface of the plano-convex lens toward the light valve, it becomes easier to set the relative positions of the Gf lens group and the light valve.

In the wide angle projection lens of the eleventh aspect of the present invention, since the Gf lens group includes an aspheric surface, high-order off-axis aberrations such as distortion aberration, coma aberration and astigmatism can be corrected strongly, to realize excellent imaging properties.

In the wide angle projection lens of the twelfth aspect of the present invention, since the Abbe numbers of the respective vitreous materials making up the first lens, the second lens and the third lens are defined by the conditional expressions (9), (10) and (11) and the refractive indices of the respective vitreous materials making up the first lens, the second lens and the third lens are defined by the conditional expressions (12), (13) and (14), it is possible to achieve a wide angle projection lens with chromatic aberration well corrected.

In the wide angle projection lens of the thirteenth aspect of the present invention, since the Abbe numbers of the respective vitreous materials making up the eighth lens, the tenth lens and the eleventh lens are defined by the conditional expressions (15), (16) and (17) and the refractive indices of the respective vitreous materials making up the eighth lens, the tenth lens and the eleventh lens are defined by the conditional expressions (18), (19) and (20), it is possible to achieve a wide angle projection lens with chromatic aberration well corrected.

According to the fourteenth aspect of the present invention, it is possible to achieve a small-size, high-quality and low-cost projection display device mounted with the wide angle projection lens of any one of the first to thirteenth aspects.

According to the fifteenth aspect of the present invention, by disposing a plano-convex lens near the light valve, it is possible to achieve a projection display device capable of efficiently transmitting the luminous flux from the illumination optical system, being reflected by the light valve and entering the projection optical system. Further, by facing the plane surface of the plano-convex lens toward the light valve, it becomes easier to set the relative positions of the Gf lens group and the light valve.

According to the sixteenth aspect of the present invention, since a device of off-axis projection system in which the intersection between the image display surface and the optical axis of the projection lens is displaced from the center point of the image display surface is obtained, it is possible to provide a projection display device which can avoid the interference between the illumination optical system and the projection optical system by utilizing the property of large image circle of the wide angle projection lens as defined in any one of the first to thirteenth aspects and can achieve a display image with uniform luminance distribution.

In the projection display device of the seventeenth aspect of the present invention, by setting the normal of the image display surface of the light valve and the optical axis of the projection lens parallel to each other, the distortion of the projection image can be controlled within the limits of designed distortion aberration. Further, since the optical axis of lenses other than the plano-convex lens near the light valve among the illumination optical system is tilted with respect to the normal of the image display surface of the light valve, the interference between the illumination optical system and the projection optical system can be avoided, to enhance the uniformity in luminance distribution of the display image.

According to the eighteenth aspect of the present invention, it is possible to achieve a small-size, high-quality and low-cost projection display device mounted with a liquid crystal light valve as the light valve.

According to the nineteenth aspect of the present invention, it is possible to achieve a small-size, high-quality and low-cost projection display device mounted with a light valve having a movable micromirror array, such as DMD, as the light valve.

The present invention relates to a projection lens mounted in a projection display device using a reflection liquid crystal panel and a DMD and the like as a light valve and an object of the present invention is to provide a projection lens achieving projection with wide angle of view, having a small diameter of lens on the incident side and a long back focal length to avoid an interference between the illumination optical system and the projection optical system in an off-axis projection optical system and having a large image circle required for off-axis projection.

Another object of the present invention is to provide a wide angle projection lens for a low-cost rear projection type display device achieving high-quality image projection, by satisfying the early-discussed specifications for (1) wide angle of view, (2) small diameter of a lens on the incident side, (3) long back focal length and (4) large image circle and achieving the early-discussed fundamental properties for resolving the problems, i.e., (a) low chromatic aberration, (b) low distortion aberration and (c) high resolution. A still another object of the present invention is to provide a high-quality, low-cost and small-size projection display device using the wide angle projection lens.

These and other objects, features, aspects and advantages of the present invention will become more apparent from the following detailed description of the present invention when taken in conjunction with the accompanying drawings.

BRIEF DESCRIPTION OF THE DRAWINGS

FIG. 10 shows astigmatism and distortion aberration of the wide angle projection lens in accordance with the fourth preferred embodiment of the present invention;

DESCRIPTION OF THE PREFERRED EMBODIMENTS

Now, preferred embodiments of the present invention will be discussed below.

In the following discussion of the preferred embodiments, a "large conjugate side" refers to an outgoing side of projection light (screen side in a projection display device) and a "small conjugate side" refers to an incident side of projection light (light valve side in the projection display device).

Further, in tables of the preferred embodiments, S denotes the number of lens surface, OBJ denotes a screen surface, R denotes a radius of curvature (mm), T denotes a surface spacing (mm), Nd denotes refractive index of a vitreous material with respect to a wavelength of the d line (d line of He=587.56 nm), υd denotes an Abbe number in the d line, Type indicates the type of a special surface, ASP indicates an aspheric surface and STO indicates a stop surface.

In the third, fourth, fifth and sixth preferred embodiments, an aspheric surface is used. The shape of the aspheric surface is expressed with its surface vertex as a reference point by the following equation:

$$Z = \frac{Y^2/R}{1+\{1-(1+K)Y^2/R^2\}^{1/2}} + DY^4 + EY^6 + FY^8 + GY^{10} \qquad (21)$$

where Z denotes a distance in the direction of optical axis, Y denotes a distance in the direction perpendicular to the optical axis, K denotes a conic coefficient, R denotes a radius of curvature, D denotes an aspheric coefficient in the fourth order, E denotes an aspheric coefficient in the sixth order, F denotes an aspheric coefficient in the eighth order and G denotes an aspheric coefficient in the tenth order.

Figure 1:
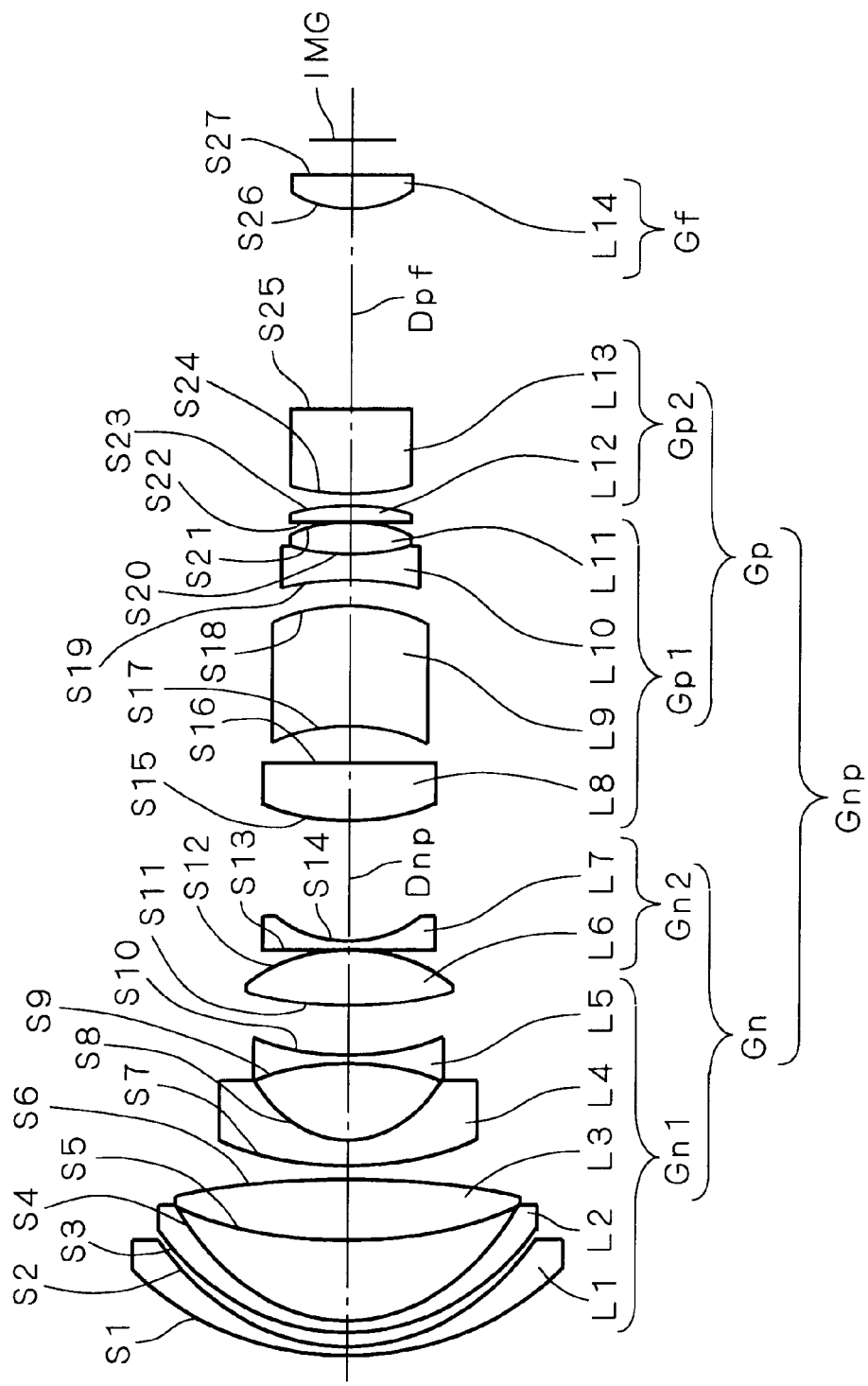
FIG. 1 shows a constitution of a wide angle projection lens in accordance with a first preferred embodiment of the present invention.
Figure 2:
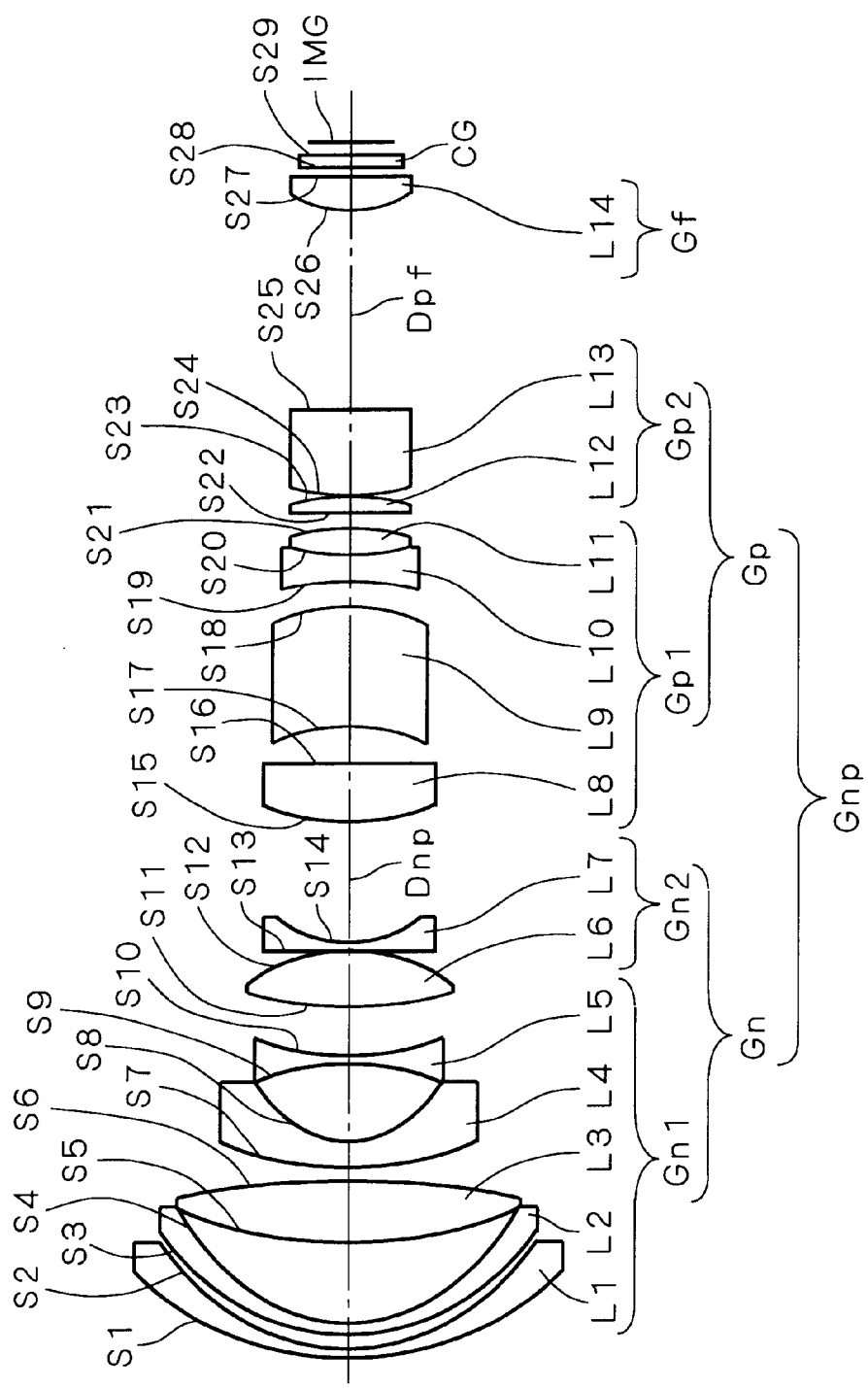
FIG. 2 shows a constitution of a wide angle projection lens in accordance with any one of second to fifth preferred embodiments of the present invention.
Figure 3:
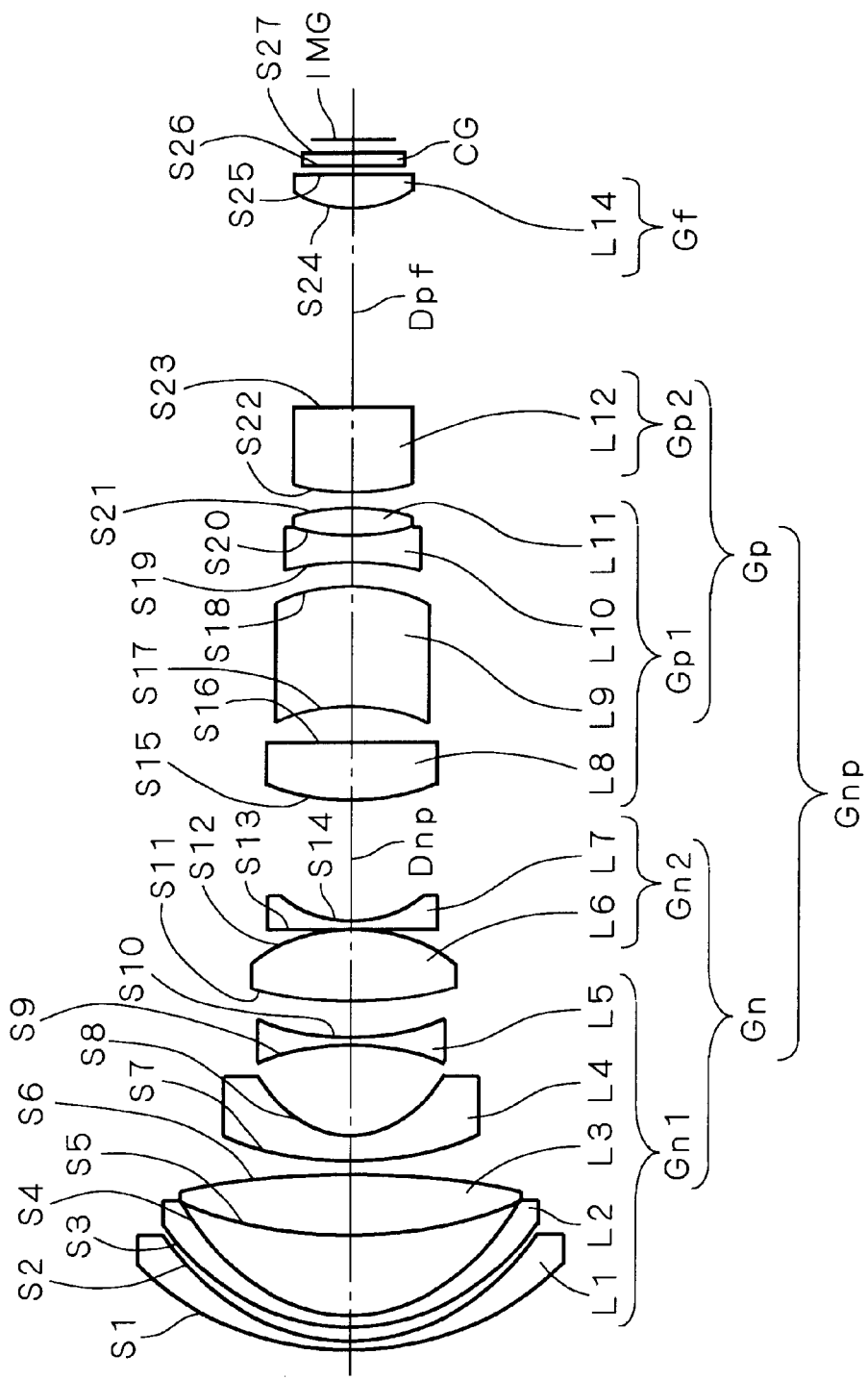
FIG. 3 shows a constitution of a wide angle projection lens in accordance with a sixth preferred embodiment of the present invention.

In FIGS. 1, 2 and 3, IMG denotes an image display surface of the light valve.

The First Preferred Embodiment

FIG. 1 shows a constitution of a wide angle projection lens in accordance with the first preferred embodiment of the present invention.

The wide angle projection lens shown in FIG. 1 consists of a Gnp lens group having positive refractive power and a Gf lens group having positive refractive power in the order from a large conjugate side (screen side) toward a small conjugate side. The Gnp lens group consists of a Gn lens group having negative refractive power and a Gp lens group having positive refractive power in the order from the large conjugate side toward the small conjugate side. Further, there is a large air spacing Dpf between the Gnp lens group and the Gf lens group and there is an air spacing Dnp between the Gn lens group and the Gp lens group.

The Gn lens group consists of a Gn1 lens group having negative refractive power and a Gn2 lens group having negative refractive power in the order from the large conjugate side toward the small conjugate side, and the Gp lens group consists of a Gp1 lens group having positive refractive power and a Gp2 lens group having positive refractive power in the order from the large conjugate side toward the small conjugate side.

The Gn1 lens group consists of a first lens L1 which is a meniscus lens with a convex surface on the large conjugate side, having negative refractive power, a second lens L2 which is a meniscus lens with a convex surface on the large conjugate side, having negative refractive power, a third lens L3 which is a biconvex lens having positive refractive power, a fourth lens L4 which is a meniscus lens with a convex surface on the large conjugate side, having negative refractive power and a fifth lens L5 which is a biconcave lens having negative refractive power in the order from the large conjugate side toward the small conjugate side. The Gn2 lens group consists of a sixth lens L6 which is a biconvex lens having positive refractive power and a seventh lens L7 with a concave surface on the small conjugate side, having negative refractive power in the order from the large conjugate side toward the small conjugate side.

The Gp1 lens group consists of an eighth lens L8 with a convex surface on the large conjugate side, having positive refractive power, a ninth lens L9 which is a meniscus lens with a convex surface on the small conjugate side, having positive refractive power, a tenth lens L10 which is a biconcave lens having negative refractive power and an eleventh lens L11 which is a biconvex lens having positive refractive power and connected to the tenth lens L10 in the order from the large conjugate side toward the small conjugate side. The Gp2 lens group consists of a twelfth lens L12 and a thirteenth lens L13 which is a biconvex lens having positive refractive power in the order from the large conjugate side toward the small conjugate side. Further, a surface of the thirteenth lens L13 on the large conjugate side is a stop surface (STO).

The Gf lens group is made of a fourteenth lens L14 with a convex surface on the large conjugate side and its plane surface on the small conjugate side, having positive refractive power.

Numerical example of the wide angle projection lens in the first preferred embodiment is shown in Table 1.

TABLE 1

| S | R | T | Nd | υd | Type |
|---|---|---|---|---|---|
| OBJ | infinity | 1118 | | | |
| 1 | 66.55664 | 1.39602 | 1.755200 | 27.210 | |
| 2 | 48.17361 | 9.819651 | | | |
| 3 | 64.88495 | 1.225052 | 1.784720 | 25.760 | |
| 4 | 46.04444 | 11.56983 | | | |
| 5 | 85.12604 | 11.63982 | 1.784720 | 25.900 | |
| 6 | −433.142 | 3.959718 | | | |
| 7 | 74.70599 | 6.875928 | 1.612720 | 58.580 | |
| 8 | 24.71763 | 14.08488 | | | |
| 9 | −65.09552 | 1.199965 | 1.563840 | 60.800 | |
| 10 | 39.22473 | 18.55041 | | | |
| 11 | 201.802 | 10.03459 | 1.607379 | 56.800 | |
| 12 | −37.31416 | 1.15046 | | | |
| 13 | 1414.075 | 3.459921 | 1.593800 | 61.400 | |
| 14 | 25.24892 | 26.55668 | | | |
| 15 | 50.76836 | 8.201274 | 1.722500 | 29.200 | |
| 16 | −296.2097 | 6.813572 | | | |
| 17 | −49.5808 | 24.36209 | 1.568830 | 56.130 | |

TABLE 1-continued

| S | R | T | Nd | υd | Type |
|---|---|---|---|---|---|
| 18 | −43.72033 | 7.288297 | | | |
| 19 | −66.22138 | 6.101627 | 1.805177 | 25.400 | |
| 20 | 40.37864 | 5.084779 | 1.511121 | 60.500 | |
| 21 | −47.05701 | 0.3888299 | | | |
| 22 | −150.0719 | 1.284551 | 1.612930 | 36.960 | |
| 23 | −98.51202 | 1.811819 | | | |
| 24 | 61.11409 | 18.39878 | 1.743997 | 44.800 | STO |
| 25 | −226.3197 | 50.00001 | | | |
| 26 | 23.8 | 5 | 1.438750 | 95.000 | |
| 27 | infinity | | | | |

The Second Preferred Embodiment

FIG. 2 shows a constitution of a wide angle projection lens in accordance with the second preferred embodiment of the present invention.

The constitution of FIG. 2 is different from that of FIG. 1 in that a cover glass (CG) covering the light valve is inserted in front of a surface IMG indicating an image display surface of the light valve, to correct aberration. The basic constitutions of the lens groups (Gnp, Gf), (Gn, Gp) and (Gn1, Gn2, Gp1, Gp2), the shapes of single lenses constituting the lens groups, reference signs of refractive power and the like are the same as discussed in the first preferred embodiment.

Numerical example of the wide angle projection lens in the second preferred embodiment is shown in Table 2.

TABLE 2

| S | R | T | Nd | υd | Type |
|---|---|---|---|---|---|
| OBJ | Infinity | 1118 | | | |
| 1 | 68.07931 | 1.199998 | 1.722500 | 29.200 | |
| 2 | 48.69936 | 9.652649 | | | |
| 3 | 65.43887 | 1.199995 | 1.806450 | 24.400 | |
| 4 | 46.01268 | 11.66961 | | | |
| 5 | 88.95522 | 11.28888 | 1.784720 | 25.700 | |
| 6 | −369.6945 | 2.252814 | | | |
| 7 | 74.67734 | 6.358819 | 1.622800 | 56.900 | |
| 8 | 25.00916 | 14.52073 | | | |
| 9 | −72.6193 | 1.199957 | 1.518229 | 59.000 | |
| 10 | 38.62474 | 18.87486 | | | |
| 11 | 169.8991 | 10.34046 | 1.617650 | 55.100 | |
| 12 | −38.64463 | 0.1999944 | | | |
| 13 | 1655.198 | 1.199997 | 1.603112 | 60.700 | |
| 14 | 25.3659 | 25.58402 | | | |
| 15 | 52.17227 | 13.7382 | 1.755200 | 27.580 | |
| 16 | −274.212 | 5.313874 | | | |
| 17 | −50.31065 | 25.00001 | 1.568832 | 56.300 | |
| 18 | −43.98929 | 5.715987 | | | |
| 19 | −66.74684 | 7.933292 | 1.784720 | 25.700 | |
| 20 | 36.74598 | 5.215749 | 1.516800 | 64.170 | |
| 21 | −47.31552 | 2.028399 | | | |
| 22 | −312.8571 | 2 | 1.625882 | 35.700 | |
| 23 | −214.6567 | 0.199994 | | | |
| 24 | 66.4212 | 18.109 | 1.720000 | 43.700 | STO |

TABLE 2-continued

| S | R | T | Nd | υd | Type |
|---|---|---|---|---|---|
| 25 | −128.1075 | 48.46352 | | | |
| 26 | 30 | 6 | 1.516800 | 64.200 | |
| 27 | infinity | 1.1 | | | |
| 28 | infinity | 2.74 | 1.471693 | 65.850 | |
| 29 | infinity | | | | |

The Third Preferred Embodiment

A constitution of a wide angle projection lens in the third preferred embodiment of the present invention is the same as shown in FIG. 2.

Numerical example of the wide angle projection lens in the third preferred embodiment is shown in Table 3.

TABLE 3

| S | R | T | Nd | υd | Type |
|---|---|---|---|---|---|
| OBJ | Infinity | 1118 | | | |
| 1 | 70.21306 | 1.439945 | 1.728250 | 28.300 | |
| 2 | 48.29054 | 8.367971 | | | |
| 3 | 64.5281 | 1.200119 | 1.784720 | 25.700 | |
| 4 | 45.21206 | 11.43699 | | | |
| 5 | 89.31451 | 11.90622 | 1.761819 | 26.600 | |
| 6 | −383.3717 | 2.78592 | | | |
| 7 | 78.11034 | 6.481605 | 1.589130 | 61.200 | |
| 8 | 24.75586 | 14.47902 | | | |
| 9 | −83.51015 | 1.200062 | 1.518490 | 60.260 | |
| 10 | 37.77846 | 18.8703 | | | |
| 11 | 155.2491 | 12.39085 | 1.603110 | 60.690 | |
| 12 | −38.50033 | 0.1999952 | | | |
| 13 | −143.5822 | 1.199808 | 1.589130 | 61.270 | |
| 14 | 32.72458 | 22.54605 | | | |
| 15 | 53.15846 | 15.73388 | 1.755199 | 27.500 | |
| 16 | −511.9763 | 5.819552 | | | |
| 17 | −51.85663 | 23.99732 | 1.517420 | 52.150 | |
| 18 | −48.7413 | 9.999685 | | | |
| 19 | −64.26419 | 9.118378 | 1.755199 | 27.500 | |
| 20 | 35.69465 | 5.492919 | 1.618000 | 63.400 | |
| 21 | −59.58768 | 1.96161 | | | |
| 22 | −314.3808 | 2 | 1.592700 | 35.450 | |
| 23 | −994.1254 | 1.893011 | | | |
| 24 | 52.42063 | 17.86148 | 1.666720 | 48.300 | STO, ASP |
| 25 | −119.3357 | 48 | | | |
| 26 | 30 | 6 | 1.516800 | 64.200 | ASP |
| 27 | infinity | 1.1 | | | |
| 28 | infinity | 2.74 | 1.471693 | 65.850 | |
| 29 | infinity | | | | |

<Aspheric Coefficient>

| S | K | D | E | F | G |
|---|---|---|---|---|---|
| 24 | −0.8425811 | −4.3091435e-7 | 2.064449e-10 | 7.3364344e-12 | −4.1993887e-14 |
| 26 | −1.077945 | −5.5224757e-6 | −4.186239e-8 | −6.3429754e-11 | 7.7374846e-14 |

The Fourth Preferred Embodiment

A constitution of a wide angle projection lens in the fourth preferred embodiment of the present invention is the same as shown in FIG. 2.

Numerical example of the wide angle projection lens in the fourth preferred embodiment is shown in Table 4.

TABLE 4

| S | R | T | Nd | υd | Type |
|---|---|---|---|---|---|
| OBJ | Infinity | 1118 | | | |
| 1 | 75.45096 | 1.452936 | 1.688930 | 31.180 | |
| 2 | 51.99102 | 6.831234 | | | |
| 3 | 65.36782 | 1.199972 | 1.805181 | 25.400 | |
| 4 | 44.71786 | 12.32042 | | | |
| 5 | 84.18424 | 13.84496 | 1.761821 | 26.500 | |
| 6 | −373.1729 | 2.701687 | | | |
| 7 | 80.06479 | 6.454946 | 1.622990 | 58.120 | |
| 8 | 25.66796 | 14.62028 | | | |
| 9 | −75.34499 | 1.200021 | 1.572501 | 57.800 | |
| 10 | 41.93828 | 16.97976 | | | |
| 11 | 147.5585 | 13.7981 | 1.603112 | 60.700 | |
| 12 | −39.24367 | 0.1999986 | | | |
| 13 | −374.3637 | 1.199953 | 1.617001 | 62.800 | |
| 14 | 30.37915 | 21.39874 | | | |
| 15 | 54.40781 | 13.30879 | 1.740769 | 27.800 | |
| 16 | −376.7471 | 5.832303 | | | |
| 17 | −50.95331 | 24.62839 | 1.570989 | 50.800 | |
| 18 | −48.76819 | 14.2996 | | | |
| 19 | −68.19446 | 8.924616 | 1.761800 | 26.950 | |
| 20 | 36.91444 | 5.577453 | 1.617001 | 62.800 | |
| 21 | −61.6499 | 3.667839 | | | |
| 22 | −311.9814 | 2 | 1.595510 | 39.220 | |
| 23 | −260.7429 | 4.706244 | | | |
| 24 | 57.23223 | 16.73519 | 1.664220 | 49.200 | STO, ASP |
| 25 | −126.2804 | 48.14733 | | | |
| 26 | 30 | 6 | 1.516800 | 64.200 | ASP |
| 27 | infinity | 1.1 | | | |
| 28 | infinity | 2.74 | 1.471693 | 65.850 | |
| 29 | infinity | | | | |

<Aspheric Coefficient>

| S | K | D | E | F | G |
|---|---|---|---|---|---|
| 24 | −0.8985639 | −4.8519915e-7 | 2.5753013e-9 | 1.6427386e-11 | −1.3797487e-13 |
| 26 | −0.8448385 | −5.2556389e-6 | −5.1385261e-8 | −2.8134131e-11 | 1.8741209e-13 |

The Fifth Preferred Embodiment

A constitution of a wide angle projection lens in the fifth preferred embodiment of the present invention is the same as shown in FIG. 2.

Numerical example of the wide angle projection lens in the fifth preferred embodiment is shown in Table 5.

TABLE 5

| S | R | T | Nd | υd | Type |
|---|---|---|---|---|---|
| OBJ | Infinity | 1118 | | | |
| 1 | 77.19863 | 1.433856 | 1.647690 | 33.840 | |
| 2 | 53.22559 | 6.324664 | | | |
| 3 | 66.76286 | 1.99975 | 1.846660 | 23.780 | |
| 4 | 44.45651 | 12.3501 | | | |
| 5 | 85.71198 | 13.34482 | 1.784720 | 25.760 | |
| 6 | −363.9079 | 2.644542 | | | |
| 7 | 80.51025 | 6.448506 | 1.620410 | 60.120 | |
| 8 | 25.18035 | 14.63462 | | | |
| 9 | −78.02526 | 1.211743 | 1.583126 | 59.400 | |
| 10 | 41.85947 | 16.74787 | | | |
| 11 | 149.0492 | 13.83491 | 1.593800 | 61.400 | |
| 12 | −38.3382 | 0.1999994 | | | |
| 13 | −434.1413 | 1.2 | 1.603001 | 65.500 | |
| 14 | 29.54462 | 20.97943 | | | |
| 15 | 52.26723 | 13.60528 | 1.740770 | 27.600 | |
| 16 | −478.2729 | 3.747369 | | | |
| 17 | −50.55113 | 25 | 1.517420 | 52.150 | |
| 18 | −47.19442 | 14.25737 | | | |
| 19 | −66.49834 | 9.010666 | 1.755199 | 27.500 | |
| 20 | 32.84297 | 5.629245 | 1.620000 | 62.190 | |
| 21 | −60.52164 | 4.22716 | | | |
| 22 | −678.0777 | 2 | 1.567322 | 42.817 | |
| 23 | −1597.84 | 4.279728 | | | |
| 24 | 54.44041 | 17.30742 | 1.670029 | 47.300 | STO, ASP |
| 25 | −125.039 | 48.33528 | | | ASP |
| 26 | 30 | 6 | 1.516800 | 64.200 | ASP |
| 27 | infinity | 1.1 | | | |
| 28 | infinity | 2.74 | 1.471693 | 65.850 | |
| 29 | infinity | | | | |

<Aspheric Coefficient>

| S | K | D | E | F | G |
|---|---|---|---|---|---|
| 24 | −0.5549417 | 3.9028401e-7 | 1.3076755e-9 | 1.3015012e-12 | −6.1728323e-15 |
| 25 | −1.063093 | 1.123214e-7 | 1.6989857e-8 | −1.2407091e-10 | 3.4614369e-13 |
| 26 | −0.5344878 | −3.6269359e-6 | −5.1342527e-8 | −3.7697598e-11 | 3.3861608e-13 |

The Sixth Preferred Embodiment

FIG. 3 shows a constitution of a wide angle projection lens in accordance with the sixth preferred embodiment of the present invention.

The constitution shown in FIG. 3 is different from that of the second to fifth preferred embodiments shown in FIG. 2 in that the constitution of the Gp2 lens group having two lenses is replaced by a constitution having a single biconvex positive lens L12. Other than this point, the basic constitutions of the lens groups (Gnp, Gf), (Gn, Gp) and (Gn1, Gn2, Gp1), the shapes of single lenses constituting the lens groups, reference signs of refractive power and the like are the same as discussed in the first preferred embodiment.

Numerical example of the wide angle projection lens in the sixth preferred embodiment is shown in Table 6.

TABLE 6

| S | R | T | Nd | υd | Type |
|---|---|---|---|---|---|
| OBJ | Infinity | 1118 | | | |
| 1 | 74.43409 | 1.34933 | 1.636360 | 35.340 | |
| 2 | 52.3854 | 5.879421 | | | |
| 3 | 64.9835 | 1.209907 | 1.805181 | 25.400 | |
| 4 | 43.11348 | 13.17439 | | | |
| 5 | 93.36637 | 13.91581 | 1.761819 | 26.600 | |
| 6 | −317.3023 | 3.345759 | | | |
| 7 | 90.22381 | 6.698748 | 1.638540 | 55.500 | |
| 8 | 25.39155 | 15.31231 | | | |
| 9 | −65.78767 | 1.199981 | 1.559819 | 56.014 | |
| 10 | 43.01645 | 14.0852 | | | |
| 11 | 140.4263 | 15.31696 | 1.603110 | 60.690 | |
| 12 | −37.52746 | 0.1999987 | | | |
| 13 | 1796.544 | 1.200002 | 1.651597 | 58.500 | |
| 14 | 29.90319 | 23.2087 | | | |
| 15 | 52.57905 | 13.6898 | 1.755200 | 27.530 | |
| 16 | −473.4674 | 4.790808 | | | |
| 17 | −54.29796 | 24.62168 | 1.531717 | 48.841 | |
| 18 | −48.65431 | 12.36468 | | | |
| 19 | −59.41306 | 6.270782 | 1.761798 | 27.100 | |
| 20 | 37.80685 | 5.012923 | 1.592400 | 68.300 | |
| 21 | −78.71179 | 3.144209 | | | |
| 22 | 44.76271 | 16.53947 | 1.658440 | 50.880 | STO, ASP |
| 23 | −108.3318 | 49.25056 | | | ASP |
| 24 | 30 | 6 | 1.516800 | 64.200 | ASP |
| 25 | infinity | 1.1 | | | |
| 26 | infinity | 2.74 | 1.471693 | 65.850 | |
| 27 | infinity | | | | |

<Aspheric Coefficient>

| S | K | D | E | F | G |
|---|---|---|---|---|---|
| 22 | 0.4309292 | 9.8301052e-7 | 4.6928997e-9 | 0.0 | 0.0 |
| 23 | −10.32267 | 3.6551641e-6 | 7.8845528e-8 | 0.0 | 0.0 |
| 24 | −0.6293088 | −3.6114262e-6 | −4.5696289e-8 | 0.0 | 0.0 |

Figure 4:
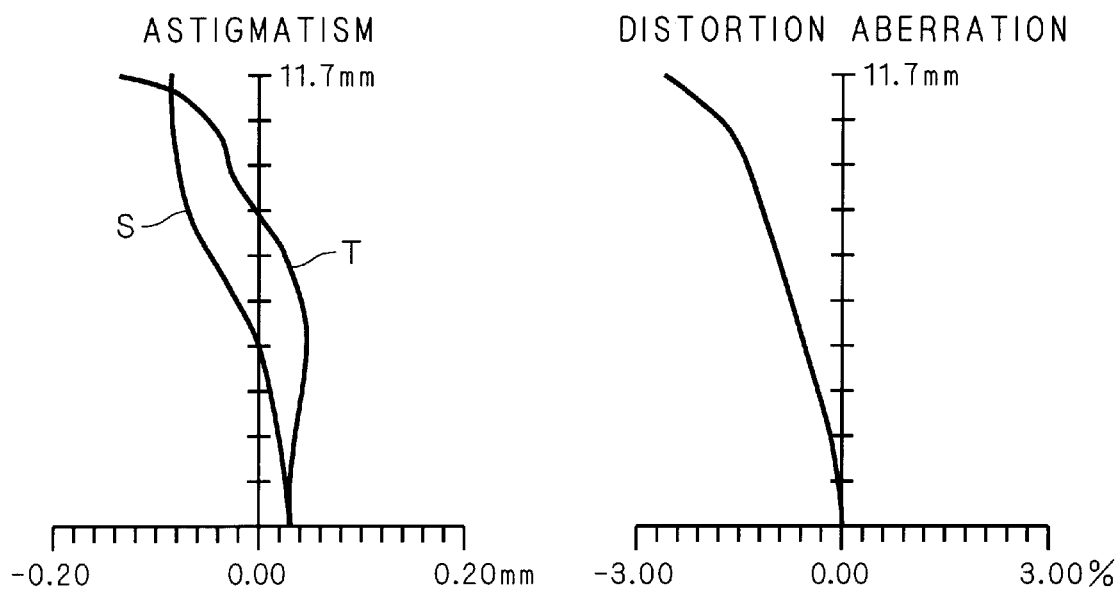
FIG. 4 shows astigmatism and distortion aberration of the wide angle projection lens in accordance with the first preferred embodiment of the present invention.

Next, the calculation results of astigmatism, distortion aberration and lateral aberration on the small conjugate side of the wide angle projection lens in accordance with the numerical examples 1 to 6 of the first to sixth preferred embodiments are shown in graphs of FIGS. 4 to 15. Correspondence between these figures and the numerical examples are as follows:

FIG. 4; astigmatism and distortion aberration in the numerical example 1

Figure 5A:
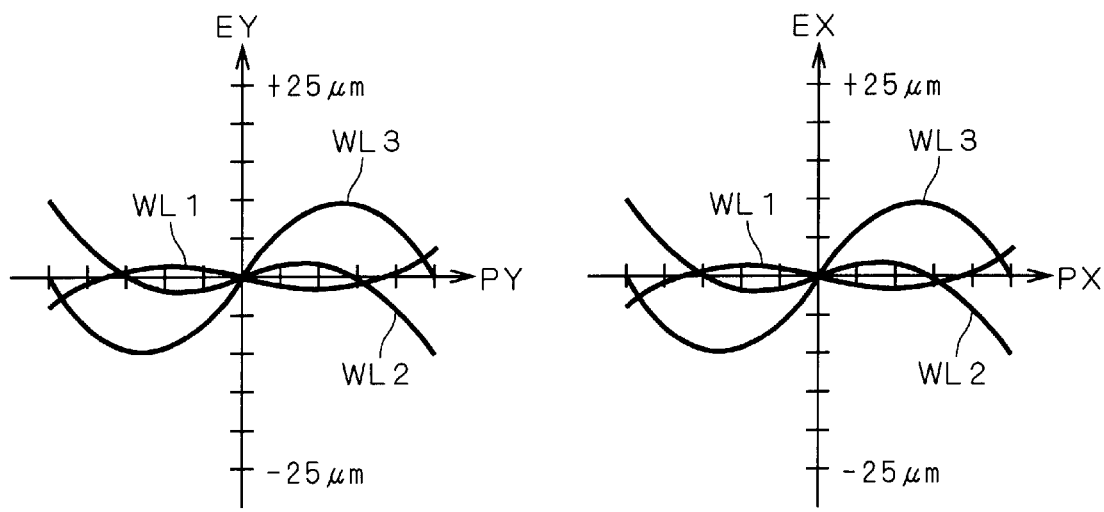
FIGS. 5A and 5B show lateral aberration of the wide angle projection lens in accordance with the first preferred embodiment of the present invention.
Figure 5B:
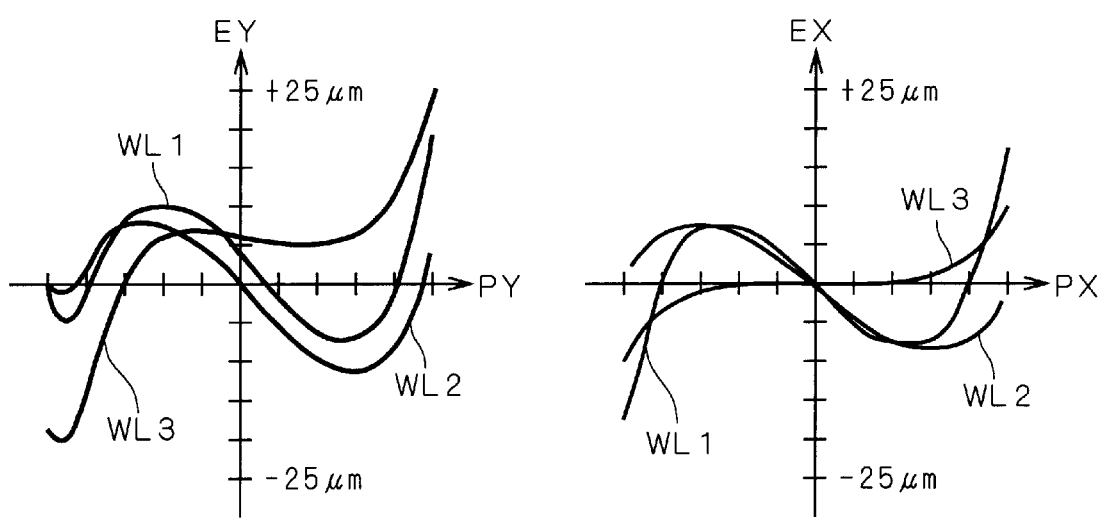

FIGS. 5A and 5B; lateral aberration in the numerical example 1

Figure 6:
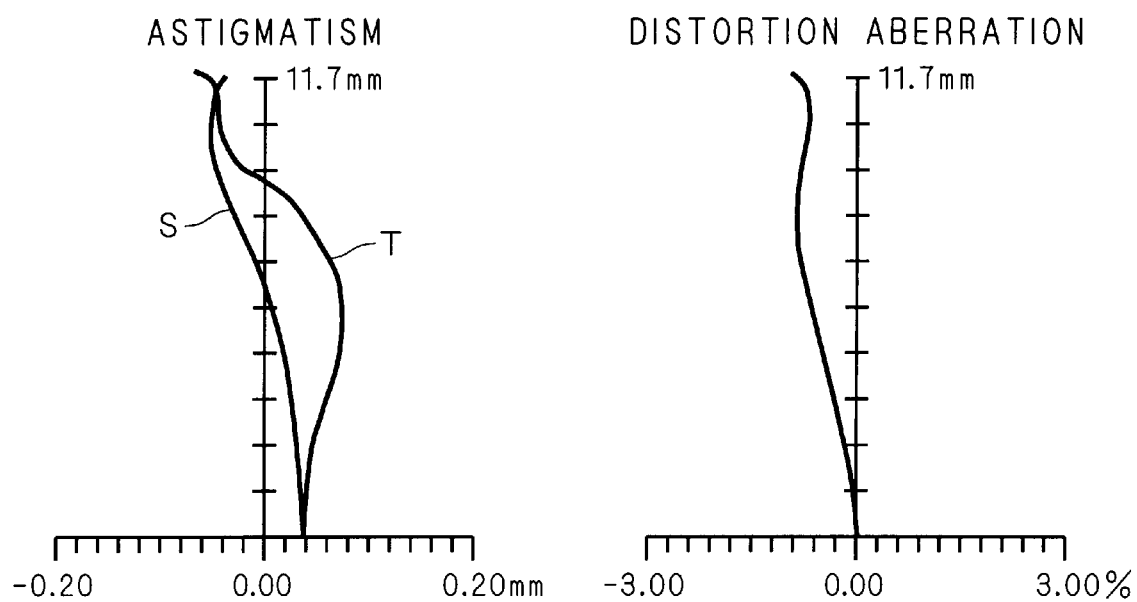
FIG. 6 shows astigmatism and distortion aberration of the wide angle projection lens in accordance with the second preferred embodiment of the present invention.

FIG. 6; astigmatism and distortion aberration in the numerical example 2

Figure 7A:
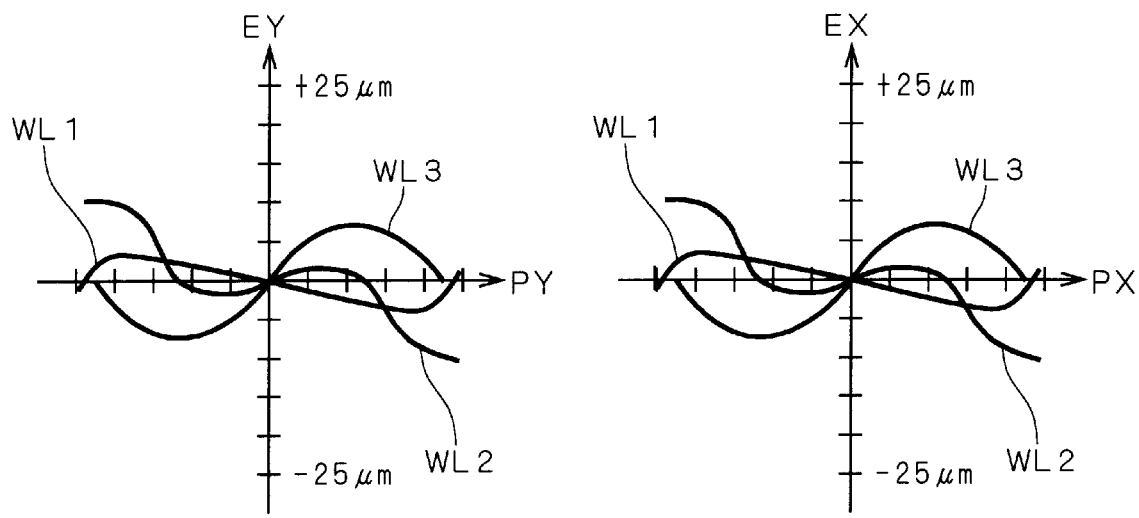
FIGS. 7A and 7B show lateral aberration of the wide angle projection lens in accordance with the second preferred embodiment of the present invention.
Figure 7B:
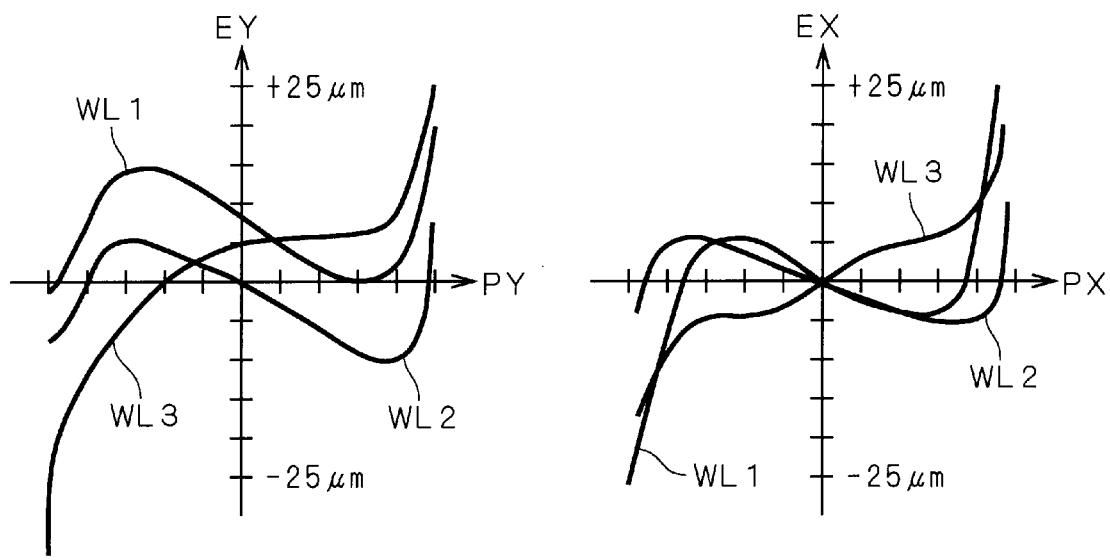

FIGS. 7A and 7B; lateral aberration in the numerical example 2

Figure 8:
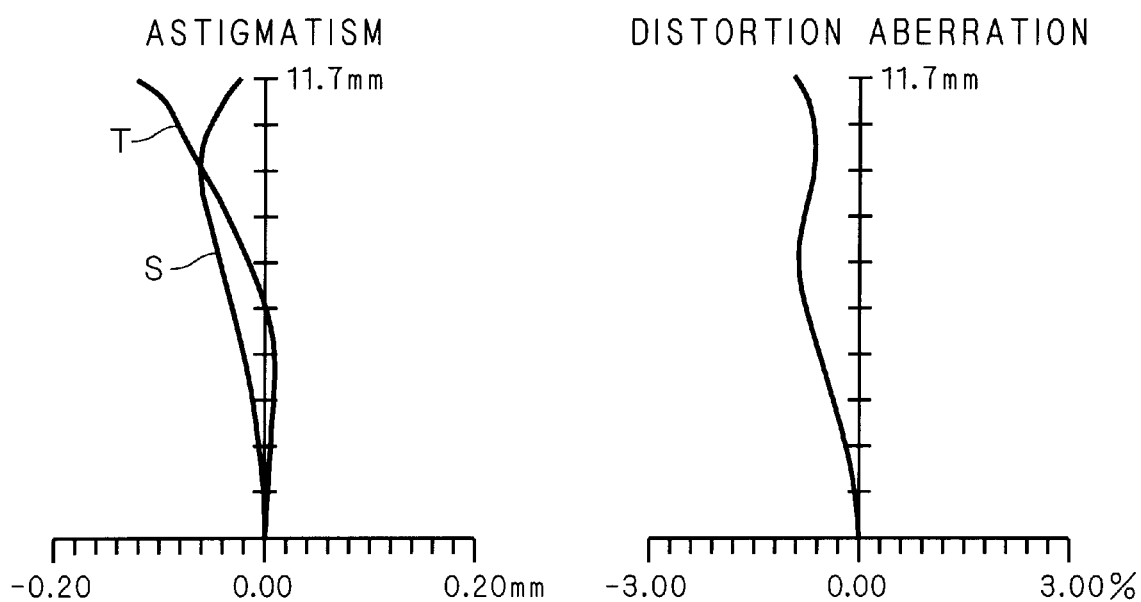
FIG. 8 shows astigmatism and distortion aberration of the wide angle projection lens in accordance with the third preferred embodiment of the present invention.

FIG. 8; astigmatism and distortion aberration in the numerical example 3

Figure 9A:
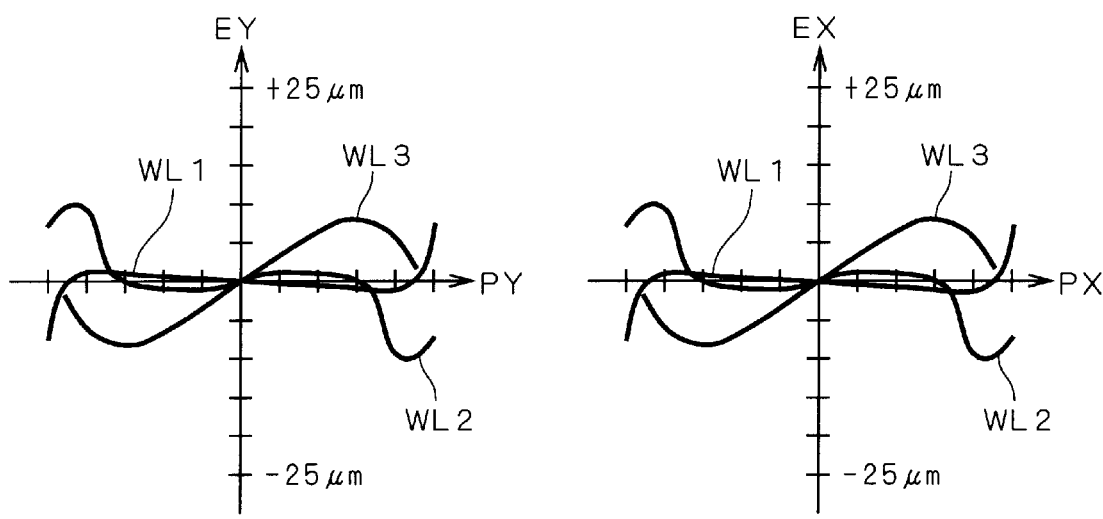
FIGS. 9A and 9B show lateral aberration of the wide angle projection lens in accordance with the third preferred embodiment of the present invention.
Figure 9B:
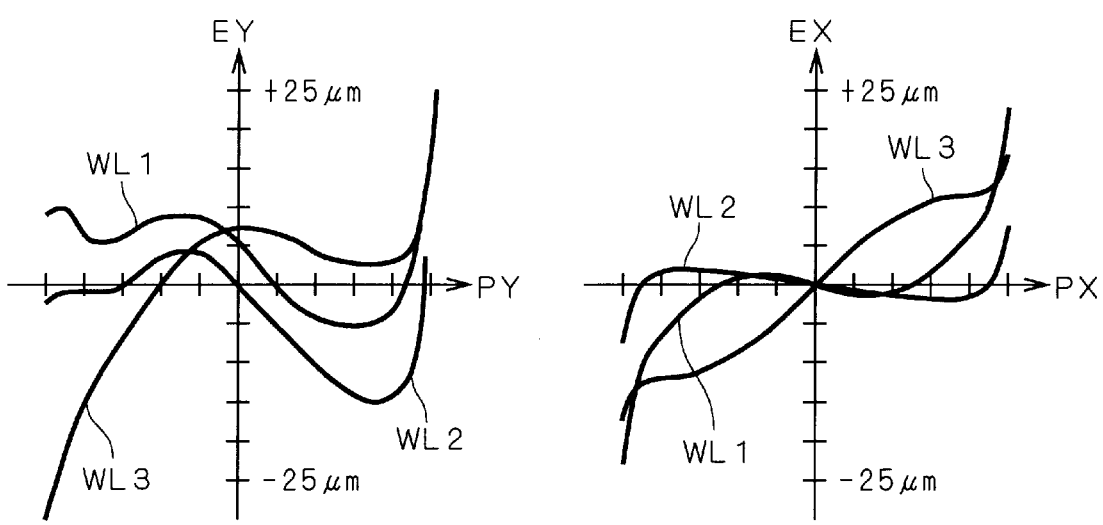

FIGS. 9A and 9B; lateral aberration in the numerical example 3

FIG. 10; astigmatism and distortion aberration in the numerical example 4

Figure 11A:
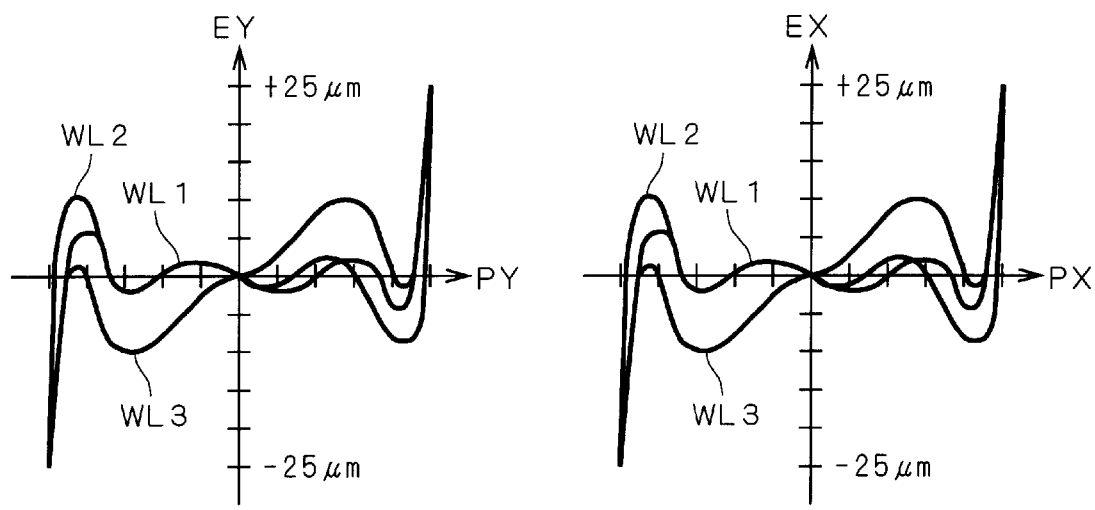
FIGS. 11A and 11B show lateral aberration of the wide angle projection lens in accordance with the fourth preferred embodiment of the present invention.
Figure 11B:
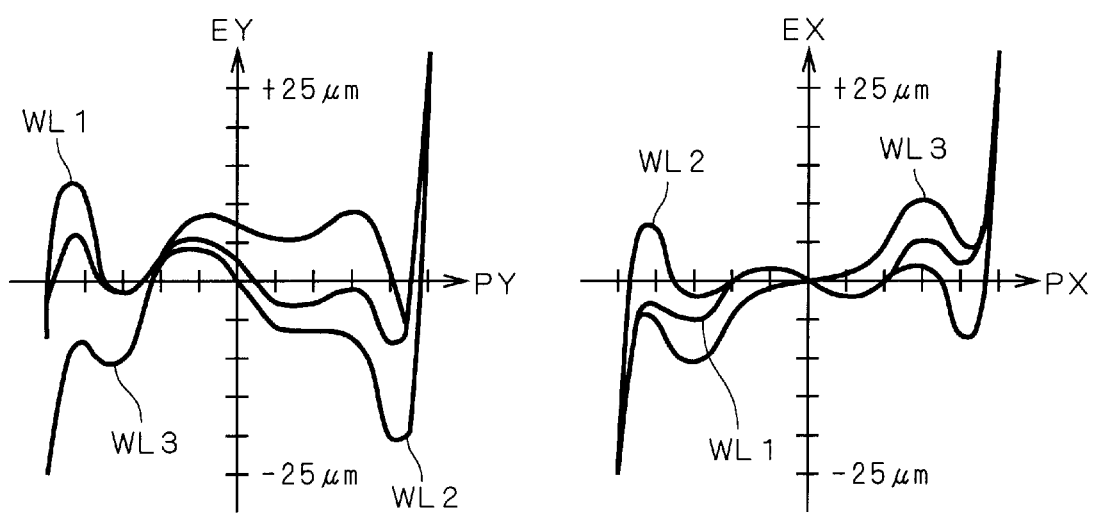

FIGS. 11A and 11B; lateral aberration in the numerical example 4

Figure 12:
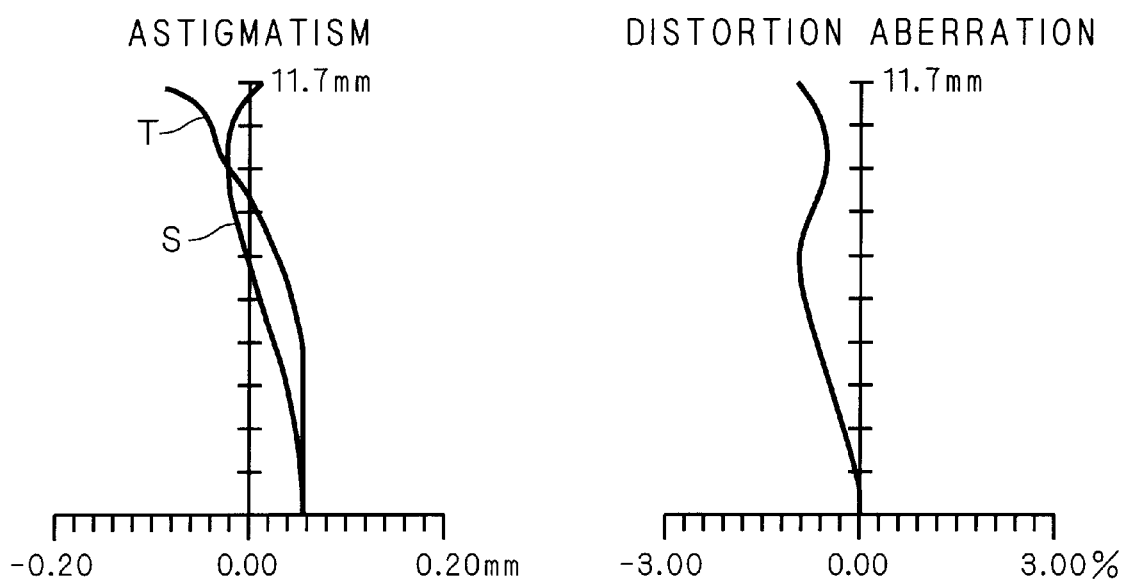
FIG. 12 shows astigmatism and distortion aberration of the wide angle projection lens in accordance with the fifth preferred embodiment of the present invention.

FIG. 12; astigmatism and distortion aberration in the numerical example 5

Figure 13A:
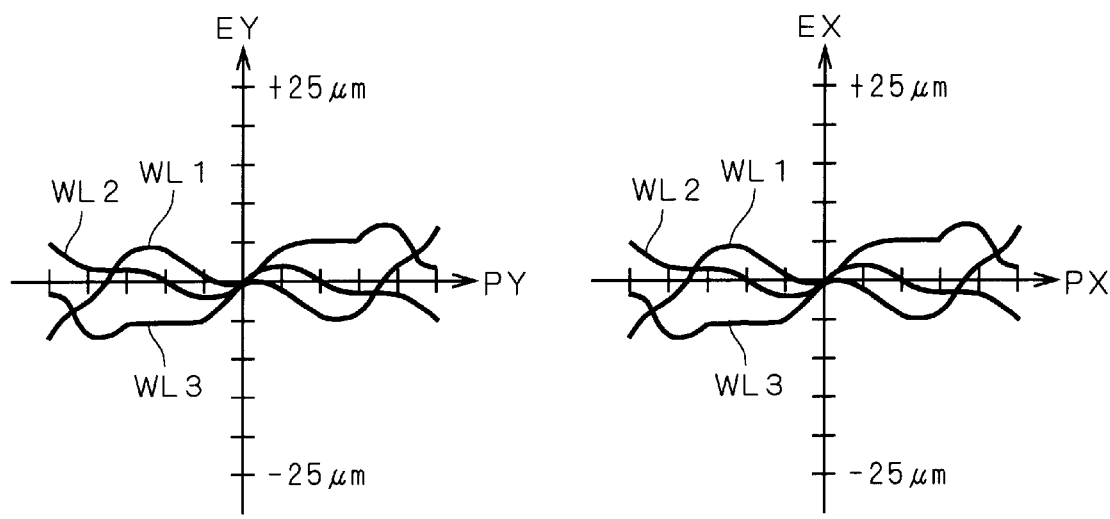
FIGS. 13A and 13B show lateral aberration of the wide angle projection lens in accordance with the fifth preferred embodiment of the present invention.
Figure 13B:
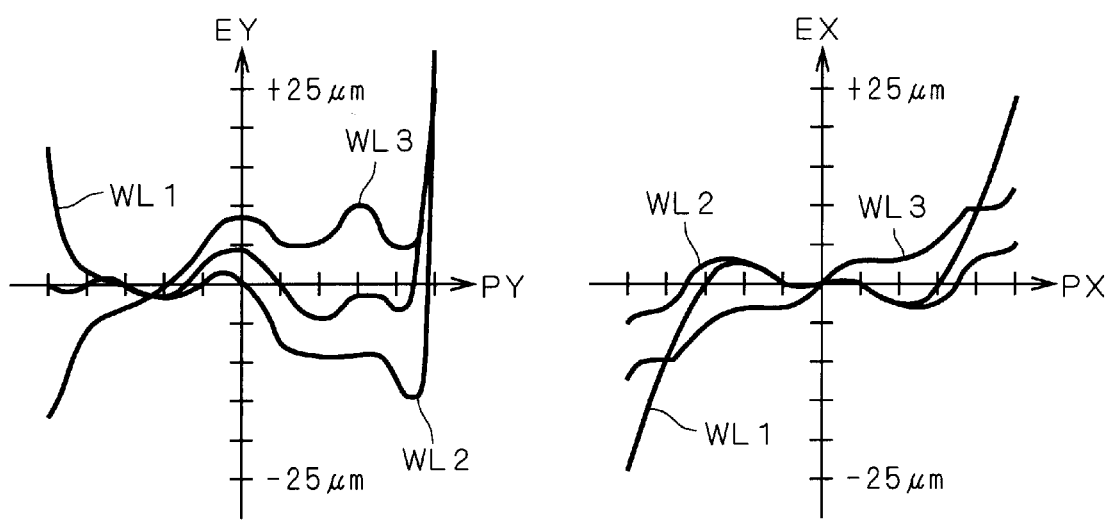

FIGS. 13A and 13B; lateral aberration in the numerical example 5

Figure 14:
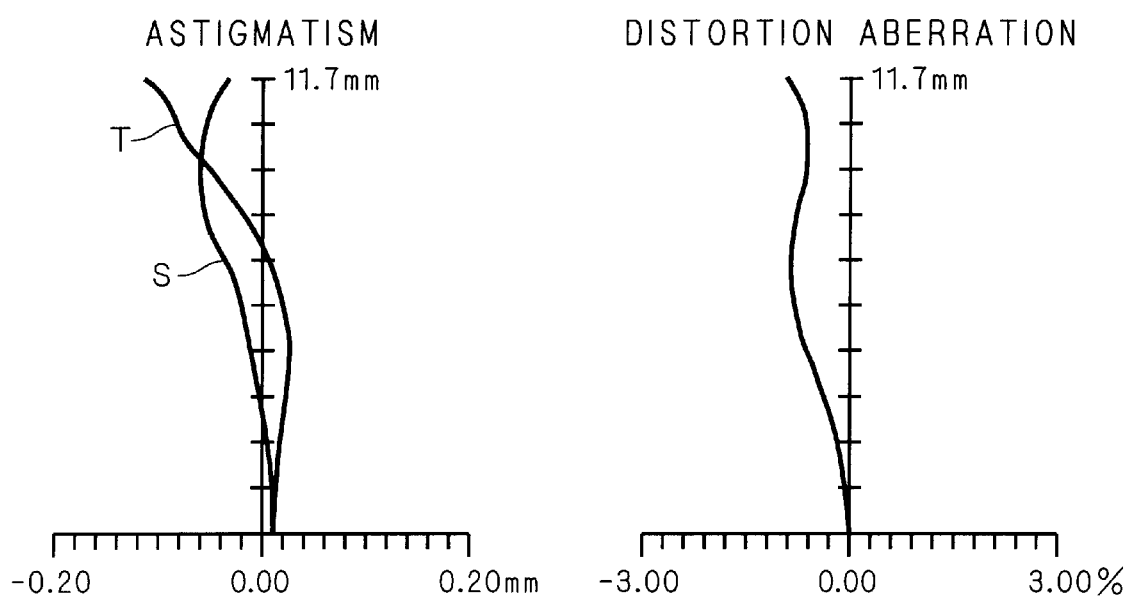
FIG. 14 shows astigmatism and distortion aberration of the wide angle projection lens in accordance with the sixth preferred embodiment of the present invention.

FIG. 14; astigmatism and distortion aberration in the numerical example 6

Figure 15A:
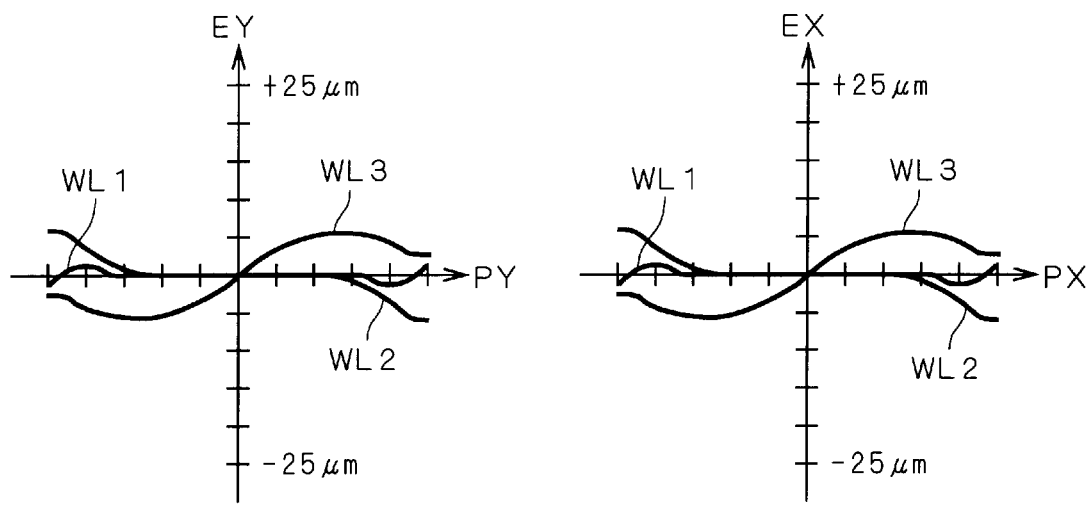
FIGS. 15A and 15B show lateral aberration of the wide angle projection lens in accordance with the sixth preferred embodiment of the present invention.
Figure 15B:
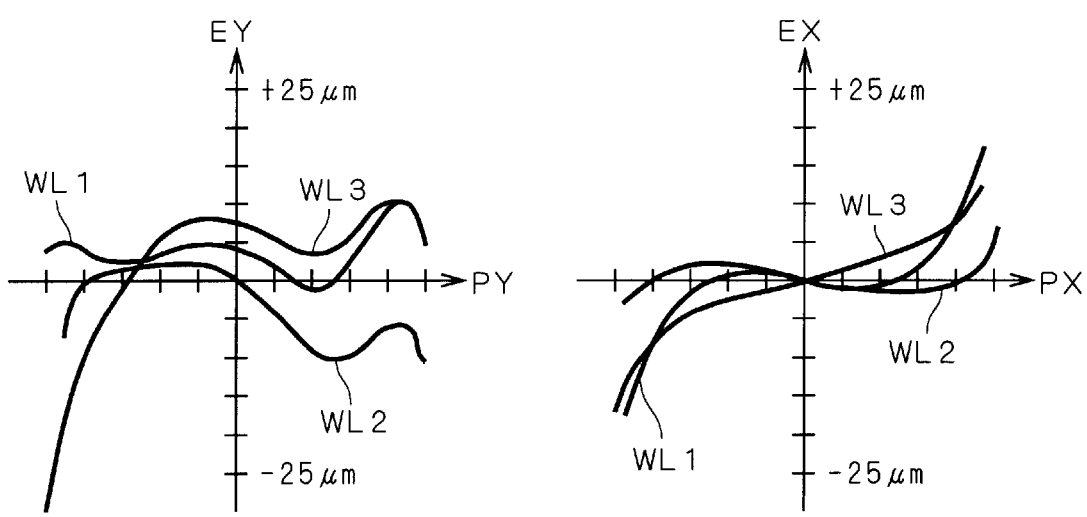

FIGS. 15A and 15B; lateral aberration in the numerical example 6.

In these figures, the astigmatism and the distortion aberration are plotted with respect to the wavelength of 546.1 nm. The astigmatism is plotted up to the maximum image height of 11.7 mm on the vertical axis assuming that an off-axis chief ray of light and a ray of light in a surface including the optical axis are tangential rays T and a ray of light perpendicular to a tangential surface, including the off-axis chief ray of light is a sagittal ray S.

The lateral aberration is plotted with respect to a wavelength WL1 of 450 nm, a wavelength WL2 of 546.1 nm and a wavelength WL3 of 630 nm. FIGS. 5A, 7A, 9A, 11A, 13A and 15A show the on-axis lateral aberrations, and FIGS. 5B, 7B, 9B, 11B, 13B and 15B show the lateral aberrations at the maximum image height of 11.7 mm.

In the projection display device using the light valve having a pixel structure in matrix, since color discrepancy over the whole screen and distortion in the projection screen can not be corrected by other means, the quality of the projection image depends directly on the degree in chromatic aberration, distortion aberration and the like of the projection lens. It can be seen from the figures showing aberration that the wide angle projection lens of the present invention can achieve a high-quality projection image with sufficiently high resolution, little color discrepancy and little distortion for the light valve having million-level pixels even under the condition of low F-stop number (F/2.4) in wide angle projection.

<Examples Applied to DMD Projection System>

Figure 19A:
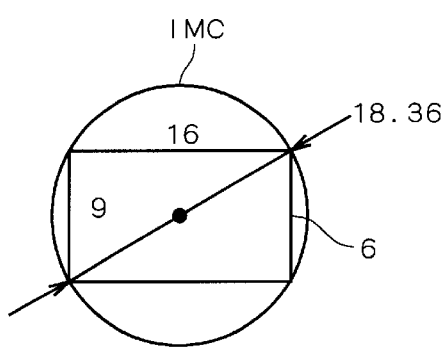
Figure 19B:
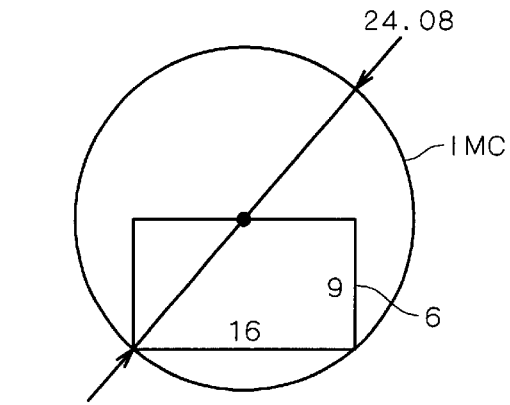

When the wide angle projection lens of the present invention is applied to a projection display device using a DMD element as a light valve, it is possible to obtain an excellent projection image in a state where a DMD chip for HDTV having a pixel pitch of 12 μm, 1280×720 pixels in number and a tilt angle of DMD unit mirror of ±12 degrees is offset in a vertical direction by 100% (see FIG. 19B).

Basic specifications of the wide angle projection lens systems in the numerical examples 1 to 6 (Tables 1 to 6) of the first to sixth preferred embodiments are shown in Table 7. Parameters (all values at the wavelength of 546.1 nm) in the Table 7 are as follows.

f: focal length of the whole lens system

ω: half angle of projection view (on the large conjugate side)

F: effective F number in normal projection magnification (on the small conjugate side)

β: normal projection magnification

TABLE 7

| Preferred Embodiments | f(mm) | ω (deg) | F | β |
|---|---|---|---|---|
| 1 | 13.50 | 40.6 | 2.4 | 87.2 |
| 2 | 13.50 | 40.6 | 2.4 | 87.0 |
| 3 | 13.50 | 40.7 | 2.4 | 87.0 |
| 4 | 13.50 | 40.7 | 2.4 | 87.0 |
| 5 | 13.50 | 40.7 | 2.4 | 86.9 |
| 6 | 13.50 | 40.7 | 2.4 | 86.9 |

Values of various parameters (all values at the wavelength of 546.1 nM) in the wide angle projection lens systems in the numerical examples 1 to 6 (Tables 1 to 6) of the first to sixth preferred embodiments are shown in Table 8. Further, values of various parameters derived from the values in Table 8 are shown in Table 9. It can be seen from Table 9 that the lens data of the numerical examples 1 to 6 satisfy the conditional expressions (1) to (8). Parameters (all values at the wavelength of 546.1 nm) in the Tables 8 and 9 are as follows.

f: focal length of the whole lens system
fn: focal length of the Gn lens group
fn1: focal length of the Gn1 lens group
fn2: focal length of the Gn2 lens group
fp: focal length of the Gp lens group
fp1: focal length of the Gp1 lens group
fp2: focal length of the Gp2 lens group
ff: focal length of the Gf lens group
fnp: focal length of the Gnp lens group
BFLnp: back focal length of the Gnp lens group (in a case of infinite incidence on the large conjugate side)
EXPnp: pupil distance of the Gnp lens group on the small conjugate side viewed from the last surface on the small conjugate side
Dnp: air spacing between the Gn lens group and the Gp lens group
Dpf: air spacing between the Gp lens group and the Gf lens group.

Among data on the Abbe number and refractive index of the vitreous materials constituting the lenses in the numerical examples 1 to 6 (Tables 1 to 6) of the first to sixth preferred embodiments, those relating to the conditional expressions (9) to (20) are collectively shown in FIGS. 10 and 11. Parameters in the Tables 10 and 11 are as follows:

ν1: Abbe number in d line of the first lens L1
ν3: Abbe number in d line of the second lens L2
ν5: Abbe number in d line of the third lens L3
ν15: Abbe number in d line of the eighth lens L8
ν19: Abbe number in d line of the tenth lens L10
ν20: Abbe number in d line of the eleventh lens L11
n1 refractive index in d line of the first lens L1
n3: refractive index in d line of the second lens L2
n5: refractive index in d line of the third lens L3
n15: refractive index in d line of the eighth lens L8
n19: refractive index in d line of the tenth lens L10
n20: refractive index in d line of the eleventh lens L11.

TABLE 10

| Preferred Embodiments | ν1 | ν3 | ν5 | ν15 | ν19 | ν20 |
|---|---|---|---|---|---|---|
| 1 | 27.21 | 25.76 | 25.90 | 29.20 | 25.40 | 60.50 |
| 2 | 29.20 | 24.40 | 25.70 | 27.58 | 25.70 | 64.17 |
| 3 | 28.30 | 25.70 | 26.60 | 27.50 | 27.50 | 63.40 |
| 4 | 31.18 | 25.40 | 26.50 | 27.80 | 26.95 | 62.80 |
| 5 | 33.84 | 23.78 | 25.76 | 27.60 | 27.50 | 62.19 |
| 6 | 35.34 | 25.40 | 26.60 | 27.53 | 27.10 | 68.30 |

TABLE 11

| Preferred Embodiments | n1 | n3 | n5 | n15 | n19 | n20 |
|---|---|---|---|---|---|---|
| 1 | 1.76 | 1.78 | 1.78 | 1.72 | 1.81 | 1.51 |
| 2 | 1.72 | 1.81 | 1.78 | 1.76 | 1.78 | 1.52 |
| 3 | 1.73 | 1.78 | 1.76 | 1.76 | 1.76 | 1.62 |

TABLE 8

| Preferred Embodiments | fn | fn1 | fn2 | fp | fp1 | fp2 | ff | fnp | BFLnp | EXPnp | Dnp | Dpf |
|---|---|---|---|---|---|---|---|---|---|---|---|---|
| 1 | −19.02 | −23.16 | −457.4 | 51.77 | 91.00 | 58.13 | 54.11 | 15.79 | 59.18 | −10.91 | 26.56 | 50.00 |
| 2 | −19.74 | −24.25 | −313.9 | 53.45 | 86.59 | 59.48 | 57.83 | 15.77 | 58.21 | −11.17 | 25.58 | 48.46 |
| 3 | −20.43 | −23.94 | −481.1 | 58.53 | 86.79 | 60.62 | 57.83 | 15.76 | 57.70 | −11.38 | 22.55 | 48.00 |
| 4 | −20.26 | −23.63 | −518.2 | 61.42 | 86.23 | 59.86 | 57.83 | 15.75 | 57.80 | −10.60 | 21.40 | 48.15 |
| 5 | −19.95 | −23.04 | −569.2 | 61.59 | 85.14 | 60.01 | 57.83 | 15.78 | 58.11 | −10.95 | 20.98 | 48.34 |
| 6 | −19.64 | −21.36 | −2258.6 | 56.29 | 97.46 | 50.03 | 57.83 | 15.77 | 58.97 | −10.60 | 23.21 | 49.25 |

TABLE 9

| Preferred Embodiments | fn/f | fp/f | Dnp/f | ff/fnp | BFLnp/fnp | |EXPnp|/fnp | Dpf/ff | (Dpf−EXPnp)/ff |
|---|---|---|---|---|---|---|---|---|
| 1 | −1.41 | 3.83 | 1.97 | 3.43 | 3.75 | 0.69 | 0.92 | 1.13 |
| 2 | −1.46 | 3.96 | 1.89 | 3.67 | 3.69 | 0.71 | 0.84 | 1.03 |
| 3 | −1.51 | 4.34 | 1.67 | 3.67 | 3.66 | 0.72 | 0.83 | 1.03 |
| 4 | −1.50 | 4.55 | 1.59 | 3.67 | 3.67 | 0.67 | 0.83 | 1.02 |
| 5 | −1.48 | 4.56 | 1.55 | 3.66 | 3.68 | 0.69 | 0.84 | 1.03 |
| 6 | −1.45 | 4.17 | 1.72 | 3.67 | 3.74 | 0.67 | 0.85 | 1.03 |

TABLE 11-continued

| Preferred Embodiments | n1 | n3 | n5 | n15 | n19 | n20 |
|---|---|---|---|---|---|---|
| 4 | 1.69 | 1.81 | 1.76 | 1.74 | 1.76 | 1.62 |
| 5 | 1.65 | 1.85 | 1.78 | 1.74 | 1.76 | 1.62 |
| 6 | 1.64 | 1.81 | 1.76 | 1.76 | 1.76 | 1.59 |

The Seventh Preferred Embodiment

Now, a projection display device mounted with the wide angle projection lens of the first to sixth preferred embodiments will be discussed below.

Figure 16:
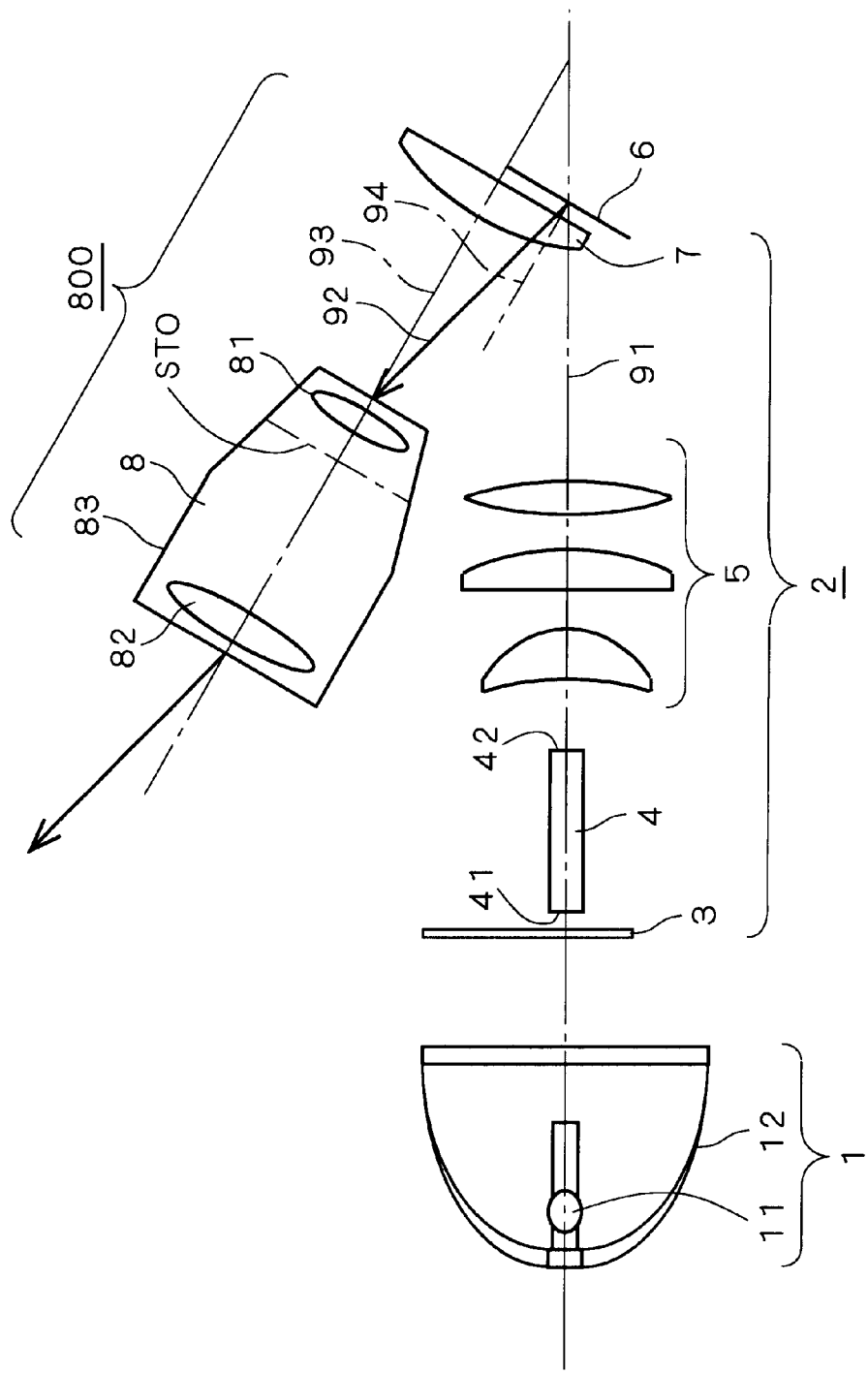
FIG. 16 shows a constitution of an optical system in a projection display device of off-axis projection system in the present invention.
Figure 17:
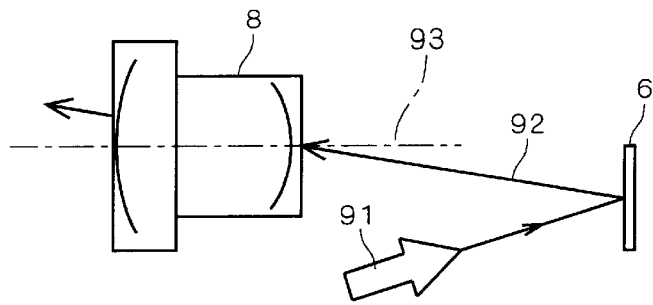
FIG. 17 shows a principle of an eccentric projection optical system using a background-art reflection light valve.
Figure 18A:
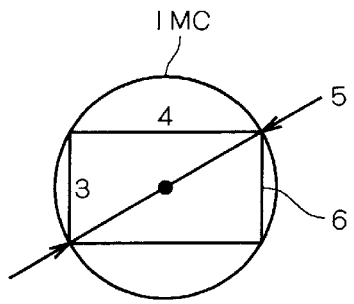
FIGS. 18A, 18B, 19A and 19B each show an arrangement of a light valve projection lens in an image circle.
Figure 18B:
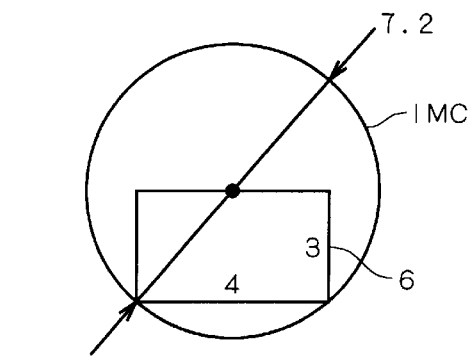

FIG. 16 shows a constitution of a projection display device of off-axis projection system in accordance with the seventh preferred embodiment of the present invention. FIG. 16 shows a light source 1 constituted of a lamp 11 and an elliptic mirror 12, a rotary color filter 3 for generating primary lights of red/green/blue, a mixing rod 4, a relay lens system 5, the reflection light valve 6 (specifically, DMD element or reflection liquid crystal panel), a field lens 7 and the front group (Gnp lens group) 8 of projection lens.

Further, an optical system 2 consisting of the mixing rod 4, the relay lens system and the field lens 7 serves as an illumination optical system. A group of lenses 800 made up of combination of the front group 8 of projection lens and the field lens 7 (Gf lens group) corresponds to the wide angle projection lens discussed in detail in the first to sixth preferred embodiments. The field lens 7 which is a plano-convex lens is disposed with its plane surface facing the image display surface of the light valve 6, serving as the Gf lens group in the projection lens system. By facing the plane surface of the plano-convex lens toward the light valve, the field lens 7 which is also used as part of the wide angle projection lens 800 can be easily positioned with respect to the light valve 6 with high precision, and this is advantageous in realization of high-resolution projection performance which depends mainly on design.

Next, an operation of the projection display device shown in FIG. 16 will be discussed. A white light from the lamp 11 is reflected by the elliptic mirror 12, going through the rotary color filter 3 and condensedly entering an incident end surface 41 of the mixing rod 4 having a rectangular shape, and reflectively transmitted in the mixing rod 4. Through a plurality of reflections inside the mixing rod 4, a circular photospot is transformed into a rectangular one. With multiple reflection inside the mixing rod 4, a two-dimensional array-like virtual source having a checkerboard pattern is formed on the incident plane surface. This superimposition of luminous flux from the virtual source resolves nonuniformity in illumination distribution of an image illuminated by the lamp and a surface light source similar to the display area of the light valve 6 is obtained on an outgoing end surface 42 of the mixing rod 4. The outgoing luminous flux from the mixing rod 4 goes through the relay lens system 5 and the field lens 7 and is led onto the display surface of the light valve 6. At that time, the surface light source on the outgoing end surface 42 of the mixing rod 4 is imaged on the image display surface of the light valve 6. The reflection luminous flux 92 two-dimensionally modulated in the image display surface of the light valve 6, going through the field lens 7 (Gf lens group), enters the front group 8 (Gnp lens group) of projection lens and is enlargedly projected on a screen which is not particularly shown, to form an image. In FIG. 16, the reference sign 81 represents a lens on the light valve side (incident side) among the front group 8 of projection lens and the sign 82 represents a lens on the screen side (outgoing side).

As well known, the rotary color filter is made of a disk-like dichroic filter which is angle-divided into sectors. In the color wheel, the spectral transmission factors in filter regions of the sectors are determined so that primary illumination lights of red/green/blue can be sequentially generated by rotationally driven by a motor.

The field lens 7 has such a focal length and an arrangement as an exit pupil of the relay lens system 5 and an entrance pupil of the projection lens 8 hold the almost conjugate relation, letting the illumination luminous flux from the relay lens system 5 enter the projection lens 8 with high efficiency. Further, the field lens 7 is a lens closest to the light valve 6 among the illumination optical system 2 and also used as the Gf lens group closest to the light valve 6 among the wide angle projection lens 800.

The optical axis 91 of the illumination optical system except the field lens 7 is set in a diagonal direction with respect to a normal 94 of the display surface of the light valve 6. The normal 94 of the image display surface of the light valve 6 is parallel to the optical axis 93 of the projection lens 8. The center point of the image display surface of the light valve 6 is eccentrically disposed downward with respect to the optical axis 93 of the projection lens 8. In other words, the light valve 6 is eccentrically disposed so that the intersection between the optical axis 93 of the projection lens 8 and the image display surface of the light valve 6 should not coincide with the center point of the image display surface. Further, as discussed in detail in the first to sixth preferred embodiments, by providing the stop STO near the lens 81 on the light valve side in the front group 8 of the wide angle projection lens 800, the entrance pupil can be set near the incident surface of the front group 8 and the diameter of the lens on the light valve side in the front group 8 (Gnp lens group) can be made smaller. The above constitution can avoid the physical interference between the illumination optical system, especially the relay lens system 5, and the projection lens 8, to form a uniform projection image with no eclipse in the projection luminous flux or illumination luminous flux. Moreover, since the optical axis 93 of the projection lens and the normal 94 of the light valve 6 are kept parallel to each other, a projection image with little distortion can be formed on the screen using the wide angle projection lens 800 intended for low aberration.

Since the projection display device of the seventh preferred embodiment satisfies the basic specifications relating to (1) wide angle of view, (2) small diameter of a lens on the incident side, (3) long back focal length and (4) large image circle and fundamental properties relating to (a) low chromatic aberration, (b) low distortion aberration and (c) high resolution, as discussed in the first to sixth preferred embodiments, when the projection display device is applied to the off-axis projection optical system, a small-size rear projection type display device can be achieved with excellent characteristic features, i.e., high quality and low cost.

Further, the type of light valve and the number of used ones are not necessarily limited to the above example (DMD, reflection liquid crystal panel), and naturally, the projection display device mounted with the wide angle projection lens shown in the first to sixth preferred embodiments can be achieved also for various well-known light valve system and various optical system mounted with these light valves if the specifications mainly on the diameter of image circle and the size of image display area of the light valve conform thereto. Furthermore, the projection system is not limited to the rear projection system using a transmission screen, and the present invention can be applied to a projection display device of front projection system using a reflection screen.

While the invention has been shown and described in detail, the foregoing description is in all aspects illustrative and not restrictive. It is therefore understood that numerous modifications and variations can be devised without departing from the scope of the invention.

What is claimed is:

1. A wide angle projection lens, comprising a Gnp lens group having positive refractive power and a Gf lens group having positive refractive power in the order from a large conjugate side toward a small conjugate side, said Gnp lens group comprising a Gn lens group having negative refractive power and a Gp lens group having positive refractive power in the order from a large conjugate side toward a small conjugate side, and said wide angle projection lens satisfying relations of the following expressions (1), (2), (3) and (4);

$$-1.8 < fn/f < -1.1 \quad (1)$$

$$3.2 < fp/f < 5.5 \quad (2)$$

$$1.2 < Dnp/f < 2.4 \quad (3)$$

$$2.8 < ff/fnp < 4.4 \quad (4)$$

where f: focal length of the whole lens system fn: focal length of said Gn lens group fp: focal length of said Gp lens group Dnp: air spacing between said Gn lens group and said Gp lens group fnp: focal length of said Gnp lens group ff: focal length of said Gf lens group.

2. The wide angle projection lens according to claim 1, satisfying a relation of the following expression (5);

$$3.0 < BFLnp/fnp < 4.5 \quad (5)$$

where fnp: focal length of said Gnp lens group

BFLnp: back focal length of said Gnp lens group.

3. The wide angle projection lens according to claim 1, satisfying a relation of the following expression (6);

$$|EXPnp|/fnp < 2.0 \quad (6)$$

where fnp: focal length of said Gnp lens group

|EXPnp|: absolute value of pupil distance on said small conjugate side of said Gnp lens group viewed from the last surface on said small conjugate side.

4. The wide angle projection lens according to claim 1, satisfying a relation of the following expression (7);

$$0.6 < Dpf/ff < 1.2 \quad (7)$$

where ff: focal length of said Gf lens group

Dpf: air spacing between said Gp lens group and said Gf lens group.

5. The wide angle projection lens according to claim 1, satisfying a relation of the following expression (8);

$$0.75 < (Dpf - EXPnp)/ff < 1.5 \quad (8)$$

where ff: focal length of said Gf lens group

Dpf: air spacing between said Gp lens group and said Gf lens group

EXPnp: pupil distance on said small conjugate side of said Gnp lens group viewed from the last surface on said small conjugate side.

6. The wide angle projection lens according to claim 1, wherein said Gn lens group comprises a Gn1 lens group having negative refractive power and a Gn2 lens group having negative refractive power in the order from said large conjugate side toward said small conjugate side, and said Gp lens group comprises a Gp1 lens group having positive refractive power and a Gp2 lens group having positive refractive power in the order from said large conjugate side toward said small conjugate side.

7. The wide angle projection lens according to claim 6, wherein said Gn1 lens group comprises a first lens which is a meniscus lens with a convex surface on said large conjugate side, having negative refractive power; a second lens which is a meniscus lens with a convex surface on said large conjugate side, having negative refractive power; a third lens which is a biconvex lens having positive refractive power; a fourth lens which is a meniscus lens with a convex surface on said large conjugate side, having negative refractive power; and a fifth lens which is a biconcave lens having negative refractive power in the order from said large conjugate side toward said small conjugate side, said Gn2 lens group comprises a sixth lens which is a biconvex lens having positive refractive power; and a seventh lens with a concave surface on said small conjugate side, having negative refractive power in the order from said large conjugate side toward said small conjugate side, and said Gp1 lens group comprises an eighth lens with a convex surface on said large conjugate side, having positive refractive power; a ninth lens which is a meniscus lens with a convex surface on said small conjugate side, having positive refractive power; a tenth lens which is a biconcave lens having negative refractive power; and an eleventh lens which is a biconvex lens having positive refractive power and connected to said tenth lens.

8. The wide angle projection lens according to claim 6, wherein said Gp2 lens group includes at least one aspheric surface.

9. The wide angle projection lens according to claim 6, wherein said Gp2 lens group includes stop means.

10. The wide angle projection lens according to claim 1, wherein said Gf lens group is made of a plano-convex lens with a convex surface on said large conjugate side.

11. The wide angle projection lens according to claim 1, wherein said Gf lens group includes an aspheric surface.

12. The wide angle projection lens according to claim 7, satisfying relations of the following expressions (9), (10), (11), (12), (13) and (14);

$$v1 < 41 \quad (9)$$

$$v3 < 31 \quad (10)$$

$$v5 < 32 \quad (11)$$

$n1 > 1.54$ (12)

$n3 > 1.65$ (13)

$n5 > 1.65$ (14)

where v1: Abbe number in d line of vitreous material making up said first lens v3: Abbe number in d line of vitreous material making up said second lens v5: Abbe number in d line of vitreous material making up said third lens n1: refractive index in d line of vitreous material making up said first lens n3: refractive index in d line of vitreous material making up said second lens n5: refractive index in d line of vitreous material making up said third lens.

13. The wide angle projection lens according to claim 7, satisfying relations of the following expressions (15), (16), (17), (18), (19) and (20);

$v15 < 35$ (15)

$v19 < 33$ (16)

$v20 > 50$ (17)

$n15 > 1.60$ (18)

$n19 > 1.65$ (19)

$n20 < 1.70$ (20)

where v15: Abbe number in d line of vitreous material making up said eighth lens v19: Abbe number in d line of vitreous material making up said tenth lens v20: Abbe number in d line of vitreous material making up said eleventh lens n15: refractive index in d line of vitreous material making up said eighth lens n19: refractive index in d line of vitreous material making up said tenth lens n20: refractive index in d line of vitreous material making up said eleventh lens.

14. A projection display device comprising:
    a light source;
    a reflection light valve having an image display surface;
    illumination optical means leading an outgoing luminous flux from said light source to said reflection light valve; and
    said wide angle projection lens as defined in any one of claims 1 to 13, enlargedly projecting a modulated luminous flux which is two-dimensionally modulated through reflection by said reflection light valve.

15. The projection display device according to claim 14, wherein
    a lens closest to said reflection light valve among optical elements constituting said illumination optical means is a plano-convex lens,
    said plano-convex lens is disposed proximately to said image display surface of said reflection light valve, with its plane surface facing the same, and
    said plano-convex lens is also used as a Gf lens group closest to a small conjugate side among groups of lenses constituting said wide angle projection lens.

16. The projection display device according to claim 14, wherein
    the intersection of said image display surface of said reflection light valve and an optical axis of said wide angle projection lens does not coincide with a center point of said image display surface.

17. The projection display device according to claim 15, wherein
    said optical axis of said wide angle projection lens is parallel to a normal of said image display surface of said reflection light valve and an optical axis of lenses other than said plano-convex lens in said illumination optical means is tilted with respect to said normal of said image display surface of said reflection light valve.

18. The projection display device according to claim 14, wherein
    said reflection light valve is a liquid crystal light valve.

19. The projection display device according to claim 14, wherein
    said reflection light valve is made of a mirror array including a plurality of tiltable unit mirrors.

* * * * *